United States Patent
Collin

(10) Patent No.: US 12,102,028 B2
(45) Date of Patent: Oct. 1, 2024

(54) ROW UNIT FOR AGRICULTURAL IMPLEMENT, AGRICULTURAL IMPLEMENT COMPRISING SUCH ROW UNIT AND METHOD OF SETTING DRILLING DEPTH

(71) Applicant: Väderstad Holding AB, Väderstad (SE)

(72) Inventor: Morgan Collin, Mjölby (SE)

(73) Assignee: Väderstad Holding AB, Väderstad (SE)

( * ) Notice: Subject to any disclaimer, the term of this patent is extended or adjusted under 35 U.S.C. 154(b) by 707 days.

(21) Appl. No.: 17/298,189

(22) PCT Filed: Nov. 29, 2019

(86) PCT No.: PCT/SE2019/051208
§ 371 (c)(1),
(2) Date: May 28, 2021

(87) PCT Pub. No.: WO2020/112014
PCT Pub. Date: Jun. 4, 2020

(65) Prior Publication Data
US 2022/0117147 A1    Apr. 21, 2022

(30) Foreign Application Priority Data
Nov. 30, 2018   (SE) ..................... 1851496-8

(51) Int. Cl.
*A01C 5/06*     (2006.01)
*A01C 7/08*     (2006.01)

(52) U.S. Cl.
CPC .............. *A01C 5/064* (2013.01); *A01C 7/08* (2013.01)

(58) Field of Classification Search
CPC ........... A01C 5/064; A01C 5/062; A01C 5/06; A01C 5/00; A01C 7/00; A01C 7/08
See application file for complete search history.

(56) References Cited

U.S. PATENT DOCUMENTS 2,685,243 A   8/1954  Cole
3,499,495 A   3/1970  Pust
(Continued)

FOREIGN PATENT DOCUMENTS

CN   206302721 U   7/2017
DE     4138633 A1   5/1993
(Continued)

OTHER PUBLICATIONS

NKE Bearings, Special Bearing Unit for the Double Disc Coulters of a Sowing Machine, accessed Jun. 4, 2021, NKE Austria, Österreich, Austria. (1 page).
(Continued)

*Primary Examiner* — Christopher J. Novosad
(74) *Attorney, Agent, or Firm* — Olive Law Group, PLLC

(57) ABSTRACT

A row unit for an agricultural implement, comprising a frame and a seed furrow-opener, wherein the seed furrow-opener comprises a pair of seed discs rotatably connected to the frame via at least one axle unit, wherein each of the seed discs has a respective geometric axis of rotation, and wherein the axes of rotation are non-parallel, so that a mutual spacing between the peripheries of the seed discs is non-constant. The axle unit is pivotable relative to the frame, so that the orientation of at least one of the axes of rotation is adjustable. An agricultural implement comprises at least one such row unit and a method of adjusting a row unit.

11 Claims, 13 Drawing Sheets

(56) References Cited

U.S. PATENT DOCUMENTS

| | | | |
|---|---|---|---|
| 4,009,668 | A | 3/1977 | Brass et al. |
| 4,090,456 | A | 5/1978 | Morrison, Jr. et al. |
| 4,116,140 | A | 9/1978 | Anderson et al. |
| 4,275,670 | A | 6/1981 | Amazonen-Werke |
| 4,779,684 | A | 10/1988 | Schultz |
| 5,074,227 | A | 12/1991 | Schwitters |
| 5,443,023 | A | 8/1995 | Carroll |
| 6,578,502 | B1 | 6/2003 | Barnstable et al. |
| 2003/0111002 | A1 | 6/2003 | Jones |
| 2009/0071383 | A1 | 3/2009 | Cey |
| 2010/0282480 | A1 | 11/2010 | Breker et al. |
| 2011/0283927 | A1 | 11/2011 | Shoup |
| 2012/0060730 | A1 | 3/2012 | Bassett |
| 2014/0090585 | A1 | 4/2014 | Sauder et al. |
| 2015/0216104 | A1 | 8/2015 | Bassett |

FOREIGN PATENT DOCUMENTS

| | | |
|---|---|---|
| EP | 2005811 A2 | 12/2008 |
| EP | 2549849 A1 | 1/2013 |
| EP | 2965606 A1 | 1/2016 |
| FR | 2415420 A1 | 8/1979 |
| GB | 773399 A | 4/1957 |
| RU | 97894 U1 | 9/2010 |
| WO | 8505246 A1 | 12/1985 |
| WO | 01/70007 A1 | 9/2001 |
| WO | 2011119095 A1 | 9/2011 |
| WO | 2015071652 A1 | 5/2015 |

OTHER PUBLICATIONS

Sawant et al., Soil bin studies on the selection of furrow opener for conservation agriculture, Journal of Soil & Water Conservation, Jun. 14, 2016, 107-112, 15(2), Soil Conservation Society of India, New Delhi. (7 pages).

Richard John Godwin, Potential of "No-till" Systems for Arable Farming, 2014, Harper Adams University, Newport, United Kingdom. (42 pages).

Unia, Gamma Mechanical Precision Drill for Maize/corn, accessed Jun. 4, 2021, Panagroteh Grup, jud. Bihor, Romania. (3 pages).

Ahmad et al., Forces and Straw Cutting Performance of Double Disc Furrow Opener in No-Till Paddy Soll, PLOS One, Mar. 30, 2015, 1-14, PLOS One, San Francisco. (14 pages).

PCT International Search Report and Written Opinion in related PCT app. PCT/SE2019/051208, filed Nov. 29, 2019, dated Mar. 13, 2020. (15 pages).

Foreign Office Action in related Swedish app. No. 1851496, filed Nov. 30, 2018, dated Jun. 5, 2019. (6 pages).

Foreign Office Action in related Swedish app. No. 1851496, filed Nov. 30, 2018, dated Jun. 5, 2019. English Translation (4 pages).

Foreign Office Action in related Swedish app. No. 1851496, filed Nov. 30, 2018, dated Jun. 5, 2020. English Translation (3 pages).

Foreign Office Action in related Swedish app. No. 1851496, filed Nov. 30, 2018, dated Jun. 5, 2020. (5 pages).

Swedish Search Report in related Swedish app. No. 1851496, filed Nov. 30, 2018, dated Jun. 5, 2019.

Translated Claims for Chinese patent No. CN206302721U filed Dec. 16, 2016, published Jul. 7, 2017. (1 page).

Translated Description for Chinese patent No. CN206302721U filed Dec. 16, 2016, published Jul. 7, 2017. (3 pages).

Translated Description for German patent No. DE4138633A1 filed Nov. 25, 1991, published May 27, 1993. (4 pages).

Translated Claims for German patent No. DE4138633A1 filed Nov. 25, 1991, published May 27, 1993. (2 pages).

Translated Description for European patent No. EP2965606A1 filed Jul. 6, 2015, published Jan. 13, 2016. (8 pages).

Translated Claims for European patent No. EP2965606A1 filed Jul. 6, 2015, published Jan. 13, 2016. (3 pages).

Translated Description for Russian patent No. RU97894U1 filed Apr. 13, 2010, published Sep. 27, 2010. (9 pages).

Translated Claims for Russian patent No. RU97894U1 filed Apr. 13, 2010, published Sep. 27, 2010. (2 pages).

Translated Description for French patent No. FR2415420A1 filed Jan. 25, 1978, published Aug. 24, 1979. (5 pages).

Notification Concerning International Preliminary Report on Patentability in related PCT application No. PCT/SE2019/051209 filed Nov. 29, 2019, dated May 25, 2021. (8 pages).

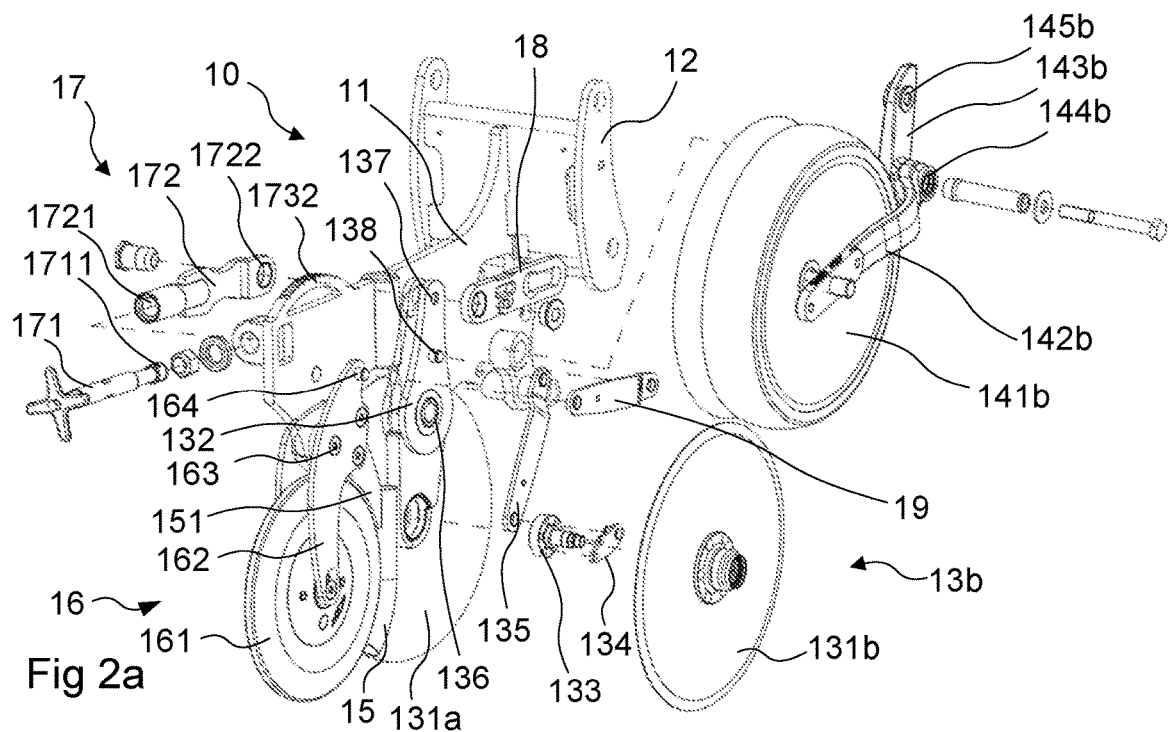
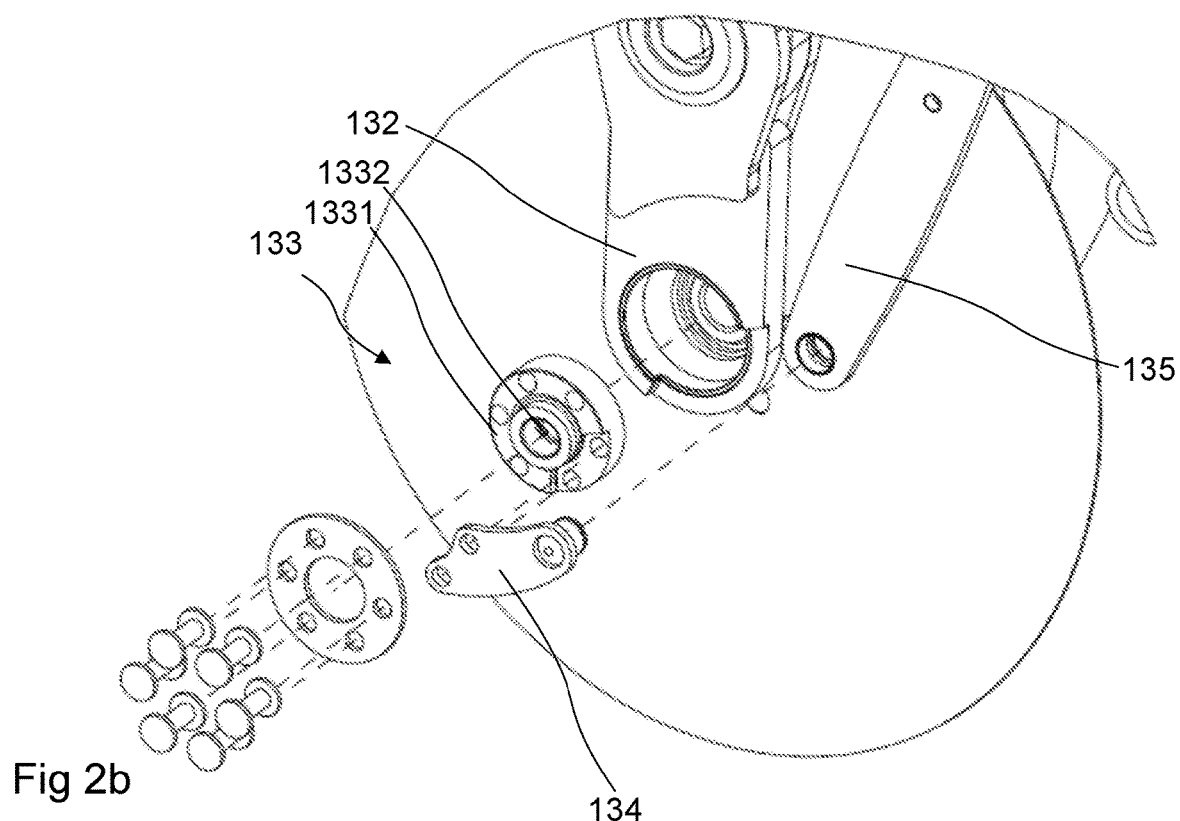

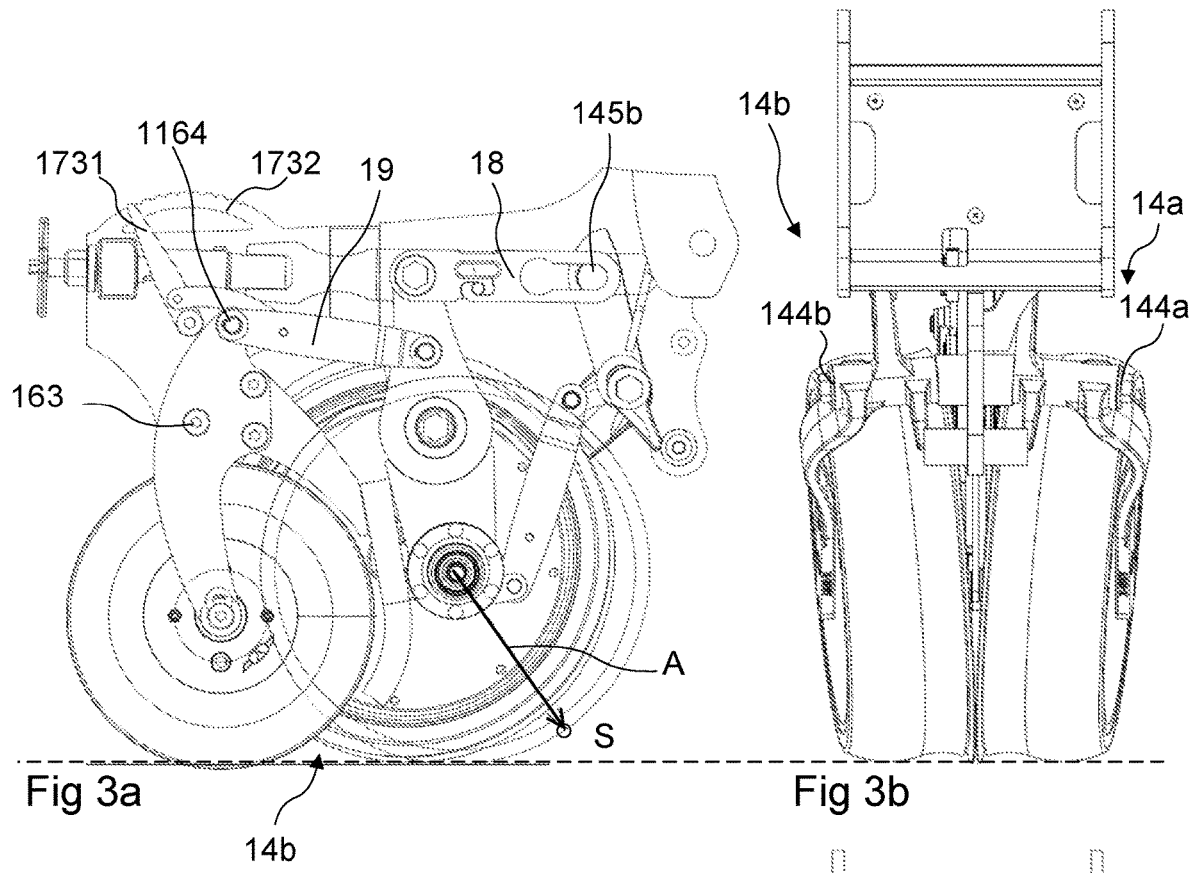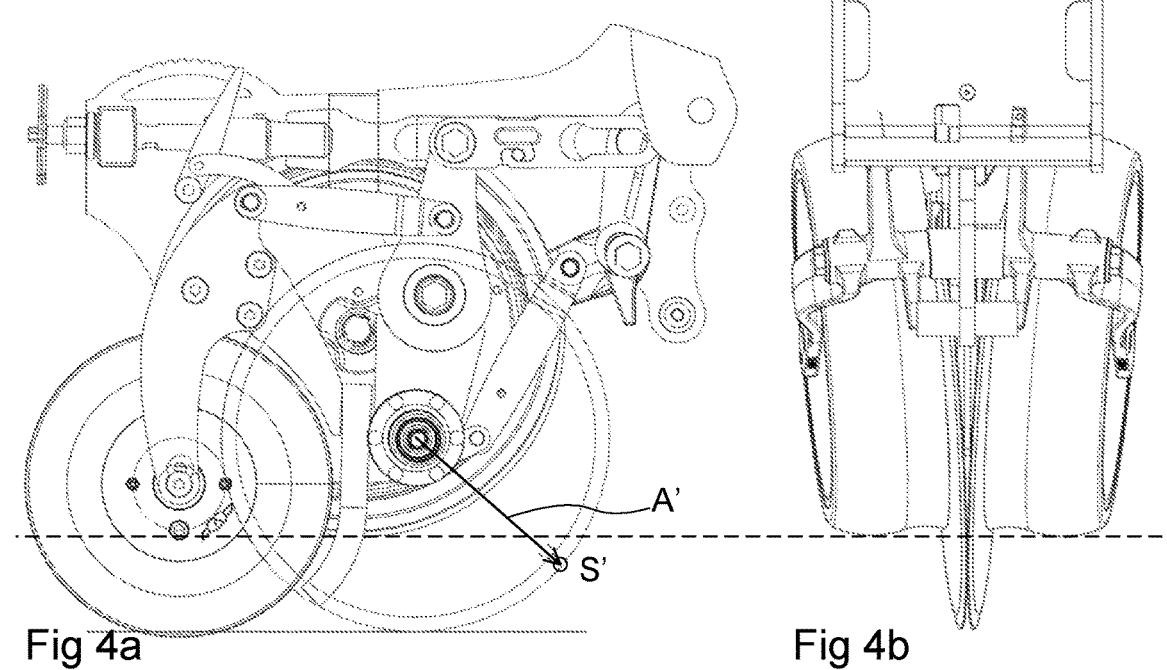

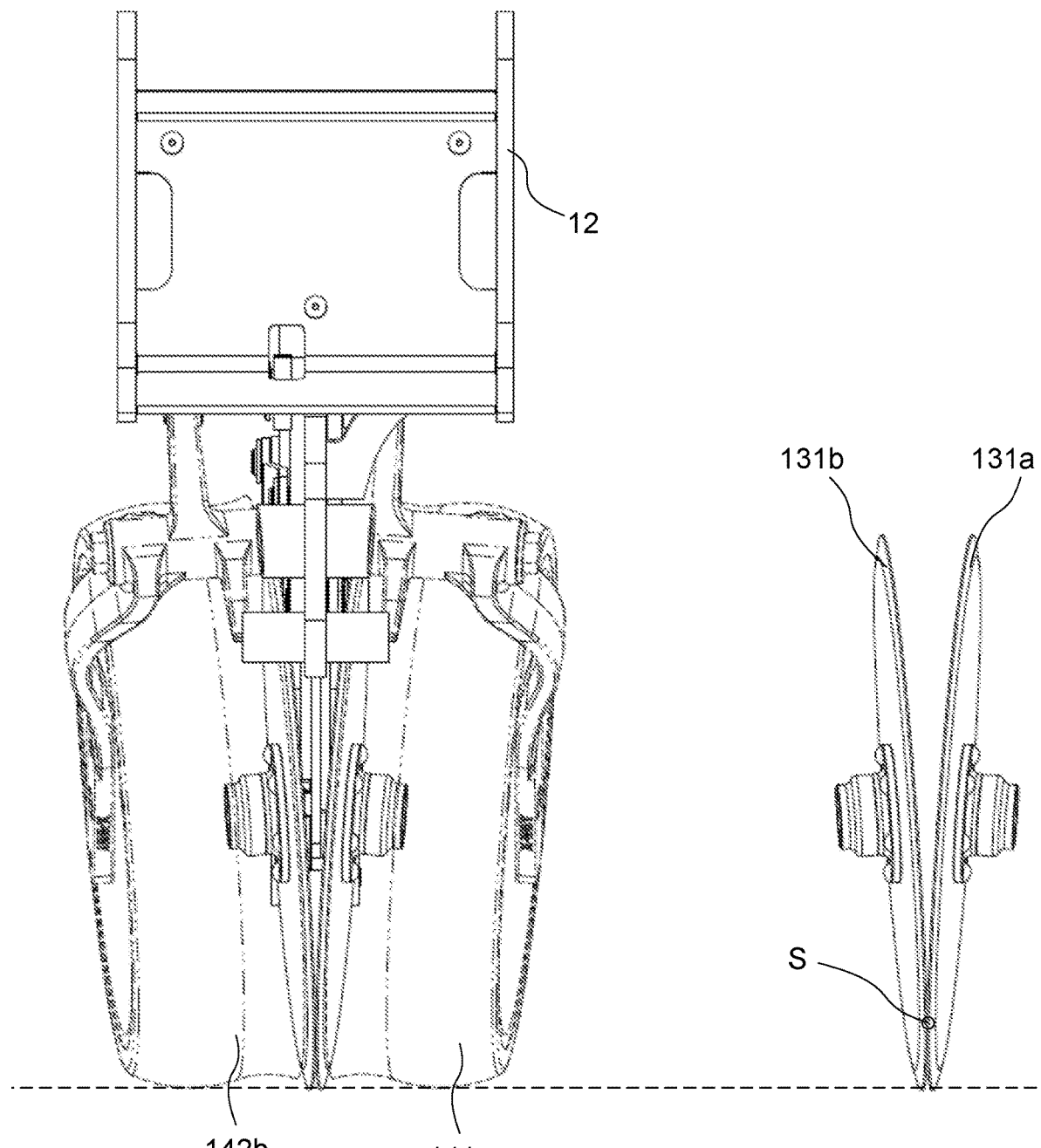

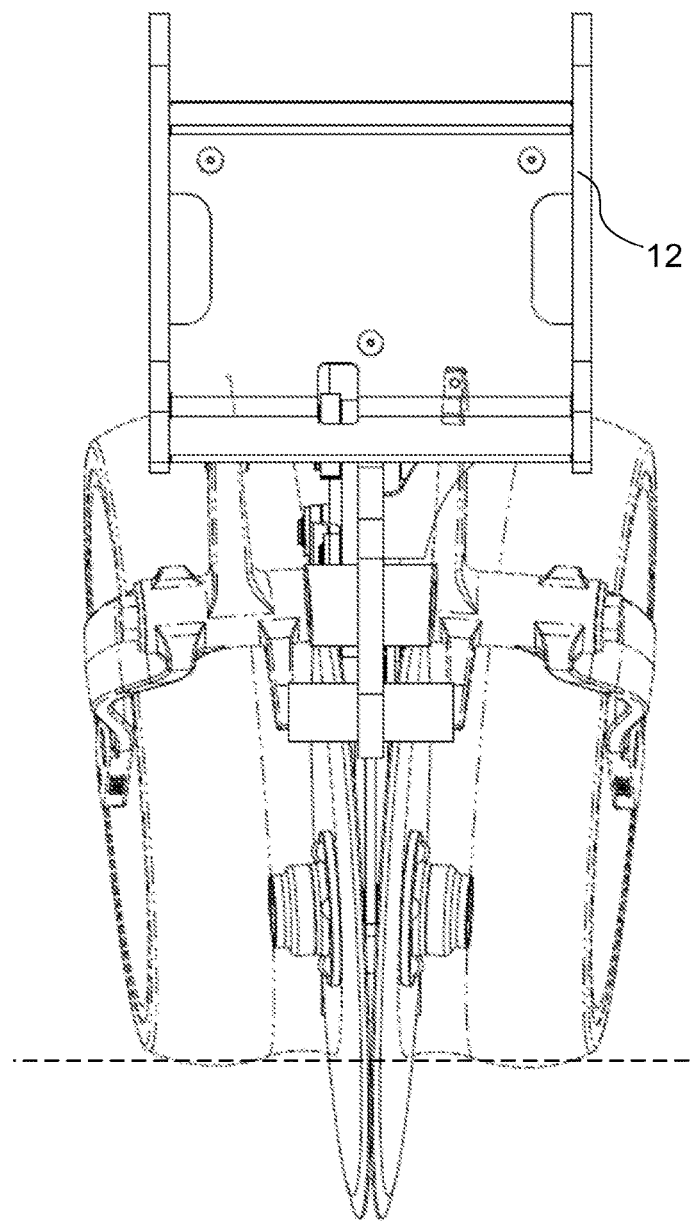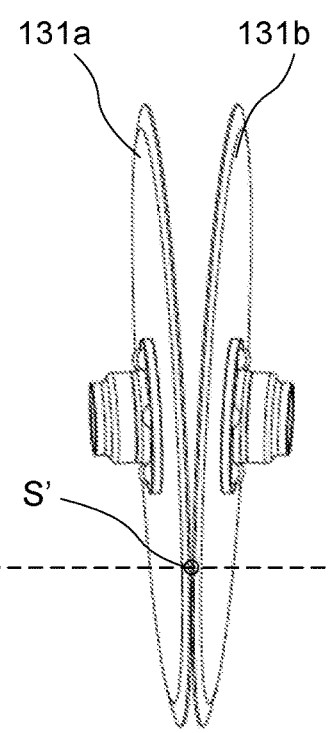
Fig 6a
Fig 6b

ROW UNIT FOR AGRICULTURAL IMPLEMENT, AGRICULTURAL IMPLEMENT COMPRISING SUCH ROW UNIT AND METHOD OF SETTING DRILLING DEPTH

CROSS REFERENCE TO RELATED APPLICATIONS

This application is a 35 USC 371 application of International PCT Patent Application No. PCT/SE2019/051208, filed on Nov. 29, 2019, which claims priority to Swedish Patent Application No. 1851496-8, filed on Nov. 30, 2018; the contents of which are hereby incorporated by reference herein in their entireties.

This application is related to the U.S. nonprovisional patent application simultaneously filed herewith titled PRESS WHEEL FOR AGRICULTURAL IMPLEMENT, ROW UNIT COMPRISING SUCH PRESS WHEEL, AGRICULTURAL IMPLEMENT, AND METHOD OF SETTING HARDNESS OF PRESS WHEEL.

TECHNICAL FIELD

This document relates to a row unit for use in an agricultural implement and an agricultural implement comprising a number of such row units. It also relates to a method of setting the drilling depth of a row unit.

BACKGROUND

It is known that agricultural implements for sowing, or any other distribution of granular or powdered material to the ground on which the agricultural implement is traveling, can be equipped with a plurality or row units.

One example of such a row unit is shown in EP2549849A1.

Each row unit has a row unit frame, being normally attached via a linkage arrangement, in order to be able to be raised or lowered, for example between a transport mode and a working mode relative to the agricultural implement frame.

The row unit can have a container for the material to be fed and a feeder for feeding the material from the container. The material container can in turn be fed from a larger, central container so that a "nursing" system is provided. The feeder can comprise a singulating unit. A sowing tube, via which the material is led downward to the ground where it is to be placed, can be connected to an outlet from the feeder.

Furthermore, each row unit comprises a first ground-engaging tool which leads the material down into the ground and a second ground-engaging tool which bears against the surface of the ground in order to ensure that the first ground-engaging tool places the material at the desired depth.

The first ground-engaging tool of a common type of row unit is formed of one or more seed furrow-openers, which can have the form of rotatable seed discs. Each seed disc is arranged to rotate about a substantially horizontal axis of rotation having an angle just under 90 degrees relative to a direction of travel of the agricultural implement.

It is customary to arrange a pair of seed discs so that they each rotate about their horizontal axis of rotation, both having respective angles that are just under 90 degrees relative to the direction of travel. Typically, the discs are angled relative to each other, so that there is a respective point on the periphery of each disc at which a minimum distance to the periphery of the second disc is present. These points are normally located in front of the axes of rotation of the discs, viewed in the direction of travel, and lower down than the axes of rotation of the discs, viewed in the vertical direction. At these points, the distance between the discs can typically be close to zero.

In some embodiments the discs are of different sizes, or they have axes of rotation that are vertically or horizontally displaced in relation to each other, wherein the distance can be smaller than zero.

The second ground-engaging tool can be one or more gauge wheels. The gauge wheels can be formed as wheels of plastic or of metal, being positioned near the seed furrow-openers and working to glide or roll on the surface of the ground, and to provide a sufficiently large abutment surface to the surface of the ground in order to be able to limit the force with which the seed furrow-openers press against the surface of the ground and thus prevent the seed furrow-openers from sinking too deeply into the ground.

Furthermore, the tool can comprise a press wheel whose function is to pick up material leaving the sowing tube and to press the material that is positioned in a groove created by the seed furrow-openers so that the material achieves good contact with the ground. Consequently, the press wheel is generally placed in line with the seed furrow-openers.

Furthermore, the row unit can comprise a seed furrow-sealer, which can comprise one or more leveling plates, scrapers or similar. Alternatively, the seed furrow-sealer can comprise one or more wheels or disc tools, which can be inclined.

Although row units as such are known, there is a need for improvements.

One such need relates to an improvement of the positioning of the fed material.

SUMMARY

One object is thus to provide a row unit which enables improved precision in the positioning of material in a seed furrow created by the seed furrow-opener.

One particular object is to provide a row unit that enables improved precision in the positioning of the material being fed by the row unit. A further object is to provide a row unit that enables improved precision in the positioning of the material regardless of the drilling depth.

The invention is defined by the attached independent patent claims. Embodiments are set forth in the dependent patent claims, in the description that follows and in the accompanying drawings.

According to a first aspect, a row unit for an agricultural implement is provided, comprising a frame and a seed furrow-opener. The seed furrow-opener comprises a pair of seed discs rotatably connected to the frame via at least one axle unit, wherein each of the seed discs has a respective geometric axis of rotation. The axes of rotation are non-parallel to each other, so that a mutual spacing between the peripheries of the seed discs is non-constant. The axle unit is pivotable relative to the frame, so that the orientation of at least one of the axes of rotation is adjustable.

The term "frame" is here a general outline, and can therefore be in the form of the row unit frame described below, or in the form of a moveable part relative to the row unit frame, such as the seed furrow-opener arm described below.

Since the seed discs are located at a distance from each other at their lowest point, the bottom of the seed furrow has the shape of a ridge, the longitudinal sides of which are formed by the respective seed disc. By means of resetting the axes of rotation, it is possible to vary the width of the bottom of the seed furrow formed by the seed discs.

When the seed furrow is made deeper, for example 50-100 mm, the walls of the seed furrow prevent the fed material from leaving the seed furrow.

However, when the seed furrow is made shallower, for example 5-25 mm, the risk of the material bouncing sideways onto the formed ridge increases. Here it is advantageous to provide a narrower seed furrow, with a lower ridge, since the precision of the sowing then increases.

The row unit can comprise an adjusting device, which is designed to act on the pivotal position of the axle unit relative to the frame.

The row unit can comprise a hub link, which is rotatably connected to the axle unit, pivotally connected relative to the frame, at a distance from a centre of rotation for the rotation of the axle unit relative to the frame.

The row unit can comprise a hub lever, which is fixedly connected to the axle unit rotatably connected relative to the frame and which extends outside a radial outer portion of the axle unit, wherein the hub link is pivotally connected to the hub lever.

The row unit can comprise at least one depth regulator, wherein the axle unit is mechanically connected to the depth regulator, so that the pivotal position of the axle unit is adjustable in a predetermined relationship to a set depth of the row unit.

The axle unit can comprise an axle mount, having a pivot axis, about which the axle mount is pivotable relative to the frame and a seed disc axle, about which the seed disc is rotatable, wherein the pivot axis and the seed disc axle are non-parallel to each other.

The axle unit can have a pair of seed disc axles, which are non-parallel to each other and to the pivot axis.

The row unit can comprise a row unit frame and a seed furrow-opener arm, which is pivotable relative to the row unit frame, wherein the axle unit is pivotable relative to the seed furrow-opener arm.

According to a second aspect, an agricultural implement comprising at least one row unit as described above is provided.

Normally, an agricultural implement comprises a plurality of row units, which can, but do not have to, be identical to each other.

According to a third aspect, a method of adjusting a row unit is provided. The row unit comprises a frame and a seed furrow-opener, wherein the seed furrow-opener comprises a pair of seed discs rotatably connected to the frame via respective axle units, wherein each of the seed discs has a respective geometric axis of rotation, and wherein the axes of rotation are non-parallel to each other, so that a mutual spacing between the peripheries of the seed discs is non-constant, viewed along the circumference of one of the seed discs. The method comprises pivoting the axle unit relative to the frame, so that the orientation of at least one of the axes of rotation is changed.

The method can comprise pivoting the axle unit together with at least one of a depth regulator and a pressure device.

In the method, the axle unit can be pivoted together with an arm that supports said depth regulator or press wheel.

BRIEF DESCRIPTION OF THE DRAWINGS

FIG. 2a shows an exploded view of a row unit.

FIG. 2b shows an exploded view of an axle unit for a seed furrow-opener disc.

FIGS. 3a-3d show a row unit set for a minimum drilling depth.

FIGS. 4a-4d show a row unit set for a maximum drilling depth.

FIG. 5a shows a view from the front of the row unit in FIGS. 3a-3b with the gauge wheel shown in broken lines for improved visibility.

FIG. 5b shows the discs in FIG. 5a uncovered.

FIG. 6a shows a view from the front of the row unit in FIGS. 4a-4b with the gauge wheel shown in broken lines for improved visibility.

FIG. 6b shows the discs in FIG. 6a uncovered.

DETAILED DESCRIPTION

Figure 1A:
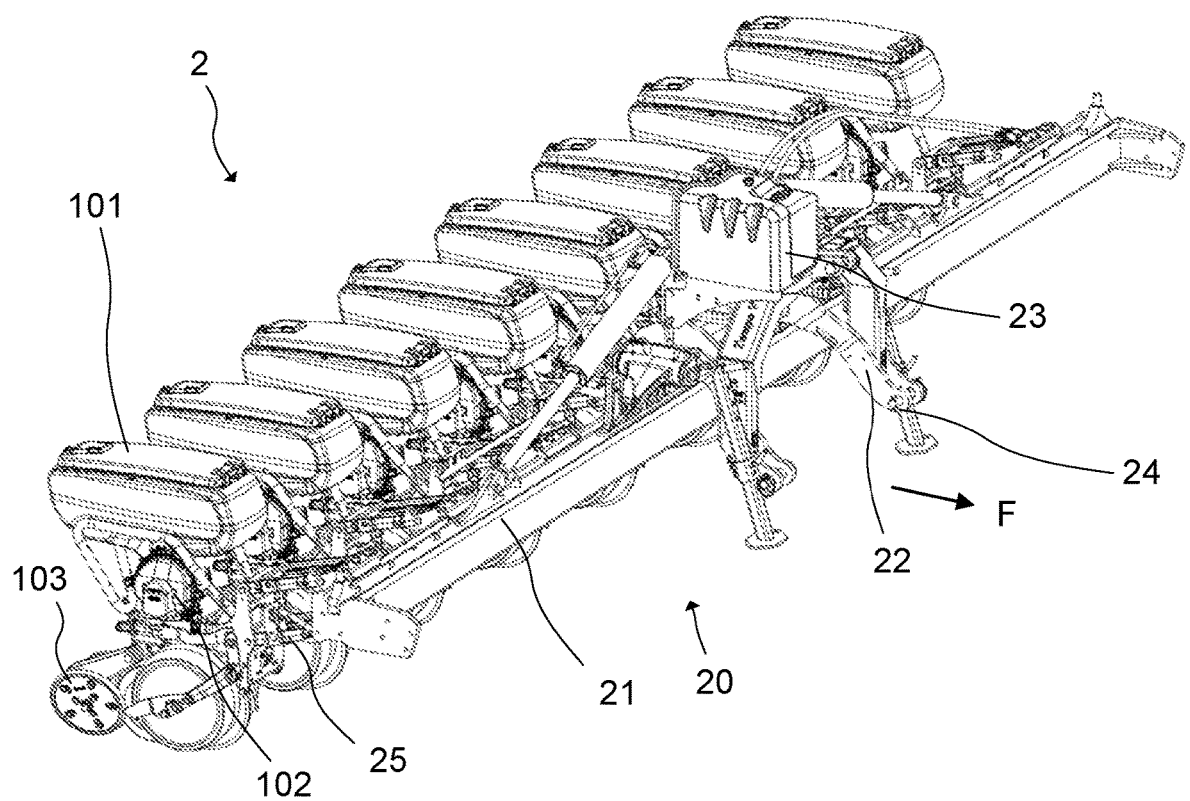
FIGS. 1a-1b show an agricultural implement comprising a plurality of row units.
Figure 1B:
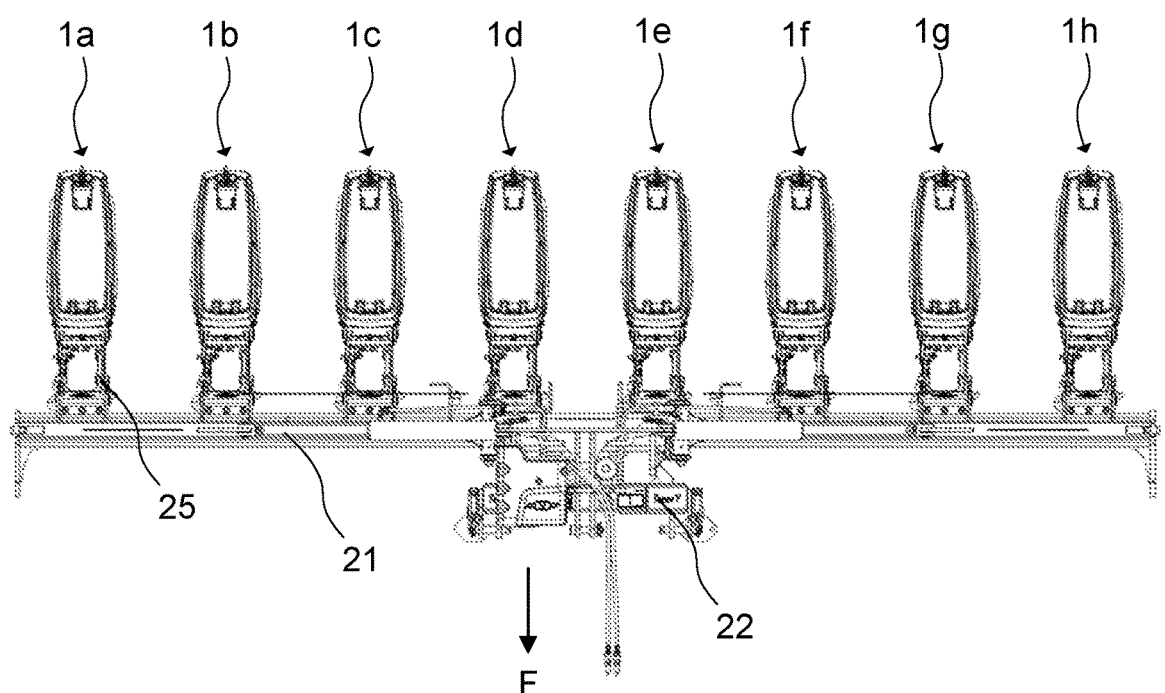

FIGS. 1a-1b show, in a perspective view obliquely from the front, respectively viewed from above, an agricultural implement 2 comprising an agricultural implement frame 20, which can comprise one or more beams 21, a coupling device 22, a control unit 23, a setting-down support 24 and a plurality of row units 1a, 1b, 1c, 1d, 1e, 1f, 1g, 1h (FIG. 1b). The agricultural implement can be formed to be fully or partly supported, or pulled, by a tractor vehicle (not shown), such as a tractor.

In the example shown, the row units 1 are mounted along a transverse (perpendicular in the example shown) beam 21 in the direction of travel F of an agricultural implement. In the example shown, the agricultural implement has a fixed width and comprises eight row units. It will be appreciated that the agricultural implement can have a variable width, so that its width can switch between a narrower transport mode and a wider working mode. For example, outer sections of the beam can be pivotable (for example about one or more vertical axes) or foldable, for example about one or more horizontal axes.

The row units 1a, 1b, 1c, 1d, 1e, 1f, 1g, 1h can be mounted via an arrangement 25 for suspension/force limitation and/or for height adjustment (for example between the transport mode and the working mode). Such an arrangement can comprise a parallel linkage and a spring and/or hydraulic cylinder.

A row unit 1 will be described below. It will be appreciated that in an agricultural implement 2 preferably, but not necessarily, all row units are identical and formed according to any of the embodiments described below.

FIG. 2a shows an exploded view of a part of a row unit 10, which comprises a row unit frame 11, a mounting interface 12, a pair of seed furrow-openers 13a, 13b, a pair of depth regulators 14a, 14b, a sowing tube 15, a pressure device 16 and an adjusting device 17.

The seed furrow-opener and the depth regulator located on the left side of the row unit, viewed in the direction of travel, are designated "13a"; "14a" respectively, and the seed furrow-opener and the depth regulator located on the right side of the row unit are designated "13b"; "14b" respectively, etc.

The row unit can further comprise a container 101 for the material to be distributed, a feeder 102 and a seed furrow-sealer 103.

The container 101 can be a local container associated with the row unit, and be designed to be filled manually. Alternatively, the container can be part of a so-called "nursing" system, i.e. a system where the local container is fed from a central container.

The feeder 102 can comprise a singulator, i.e. a device that receives material from the container 101 and feeds out granules or seeds piece by piece, so that each granule or seed can be placed with greater precision compared to a volumetric feeder.

The seed furrow-sealers 103 can comprise one or more scrapers, wheels, discs or similar, with the function of sealing a seed furrow formed by the seed furrow-opener after the material/seed has been placed therein.

The seed furrow-openers 13a, 13b comprise a pair of seed discs 131a, 131b, a seed furrow-opener arm 132, an axle unit, a hub arm 134 and an adjusting link 135. The seed furrow-opener arm 132 is pivotally connected to the row unit frame 11 via a first coupling 136 and to the adjusting device via a second coupling 137.

A lower portion of the seed furrow-opener arm 132 extends downward from the first coupling 136. The axle unit 133 is located at the lower distal portion of the seed furrow-opener arm 132. The angle of the seed furrow-opener arm relative to a vertical direction can vary +/−10 degrees, preferably +/−5 degrees, by means of pivoting about the first coupling 136. By means of this pivoting about the first coupling 136 an opportunity to displace the axle unit 133 horizontally, and thus the seed furrow-openers 13a, 13b, is provided by means of the action of the adjusting device 17. This displacement can be approximately 10-50 mm, preferably approximately 20-40 mm.

An upper portion of the seed furrow-opener arm 132 can extend upward from the first coupling 136. The adjusting device 17 can be connected to the upper distal portion of the seed furrow-opener arm 132.

The seed discs 131a, 131b are connected to the seed furrow-opener arm 132 via the respective axle unit 133.

The axle unit 133 has a substantially cylindrical axle mount 1331, which is attached to the seed furrow-opener arm 132 and a pair of axles 1333a, 1333b protruding laterally from the base 1333a, 1333b. The axles protrude in directions Ra, Rb which are non-parallel to a centre axis C of the cylindrical base. By means of both axles protruding in respective directions which are non-parallel to the centre axis C of the base, the seed discs 131a, 131b are given a plane of rotation Pa, Pb which is non-parallel to the direction of travel F of the agricultural implement and non-parallel to each other.

The axle unit 133 can be provided as a pair of separate axle units, with an axle mount each and an axle each, connected to the respective base, or as an integrated axle unit comprising an axle mount 1331 and two axles 1333a, 1333b.

With the plane of rotation Pa, Pb of the seed discs being non-parallel to each other, the seed discs can be arranged substantially symmetrically about an axis A extending through the centre of rotation of each respective seed disc. At one point of intersection of this axis A with the periphery of the seed discs, a minimum axial distance is present between the peripheries of the seed discs and, at the other, opposite point of intersection of the axis with the periphery of the seed discs, a maximum axial distance exists between the peripheries of the seed discs. This point, indicated by "S" in the drawings, will be designated tangent point below, since the seed discs, at this point, are closest to each other, and thus can, but do not have to, be tangent to each other.

Figure 3C:
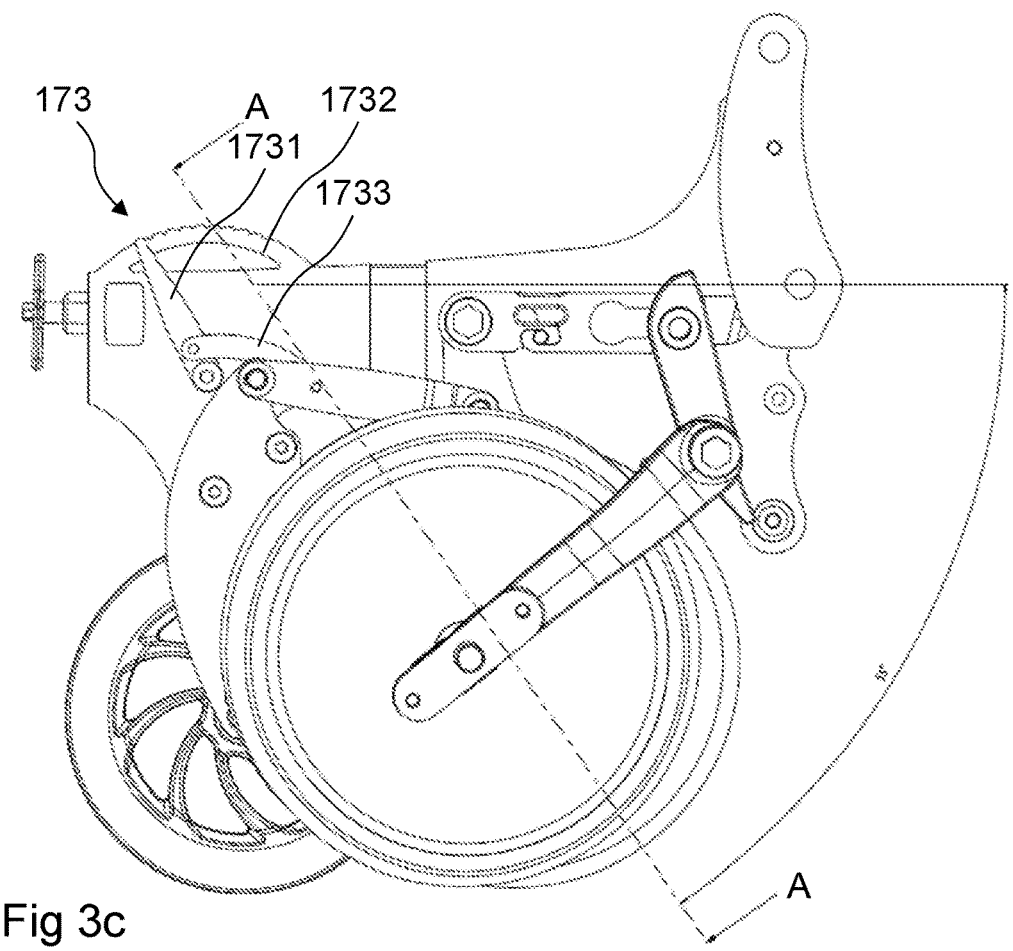

The directions Ra, Rb (which are non-parallel) of the axles 1333a, 1333b define a plane, in which said axis A described above and the tangent point S are located. The orientation of this plane is seen in the section marking A-A in FIG. 3c. A sectional view of the plane can be seen in FIG. 3d.

The orientation of the axle unit 133, and thus the seed discs, relative to the row unit frame and/or the seed furrow-opener arm, can be fixed and thus unchangeable.

Alternatively, the orientation of the axle unit 133 relative to the row unit frame 11 and/or the seed furrow-opener arm 132 can be variable.

For example, the orientation of the axle unit 133, and thus the seed discs, relative to the seed furrow-opener arm 132 can be fixed. Consequently, if the seed furrow-opener arm is pivotable relative to the row unit frame 11, the orientation of the seed discs can therefore be made variable relative to the row unit frame 11.

However, if instead, or as a complement, the orientation of the axle unit 133, and thus the seed discs, relative to the seed furrow-opener arm 132 is variable, the orientation of the seed discs relative to the row unit frame 11 can be variable. In addition, the orientation of the seed discs relative to the seed furrow-opener arm 132 can be variable.

An additional possibility, which will not be described any further, is that the orientation of the seed discs relative to the row unit frame 11 can be held constant despite the orientation of the seed furrow-opener arm relative to the row unit frame being variable.

FIGS. 3a-3d together with FIGS. 4a-4d, 5a-5b and 6a-6b show how the axis A in a first position (FIGS. 3a-3d, 5a-5b) has a more upright orientation compared to the axis A' in a second position (FIGS. 4a-4b, 6a-6b). This means that the tangent point S in FIGS. 3a-3d is located on a lower vertical level than the tangent point S' in FIGS. 4a-4d.

By means of pivoting the axle unit 133, or part thereof, so that the orientation of the plane defined by the directions Pa, Pb of the axles is changed, it is therefore possible to control the height position of the tangent point S and the horizontal distance between the lowest portions of the seed discs.

Since it is desirable for the tangent point S to be located near the surface of the ground, but also sufficiently close to the bottom of the seed furrow in order to avoid too great a ridge, it is thus possible to optimize the mutual positions of the seed discs in relation to the desired drilling depth.

Since it is also possible to control the horizontal distance between the lowest portions of the seed discs, it is thus possible to optimize, and especially minimize, the width of the seed furrow, which is particularly desirable when sowing is to take place at a smaller depth.

In FIG. 2b a part of an axle unit 133 and the lower part of the seed furrow-opener arm 132 are shown.

The axle unit 133 comprises an axle mount 1331 that has a recess 1332 for receiving a pair of axles 1333a, 1333b. Then seed disc hubs 1334a, 1334b are mounted on the axles with a roller bearing (not shown) arranged between the axle and the seed disc hub.

The axle mount 1331 can be generally cylindrical and have a thickness which substantially corresponds to a material thickness with a recess in the seed furrow-opener arm 132, in which the axle mount 1331 is to be placed.

The recess 1332 can comprise a pair of cylindrical or conical mounting portions, which can be threaded, for example, in order to be able to receive the axles 1333a, 1333b.

Figure 3D:
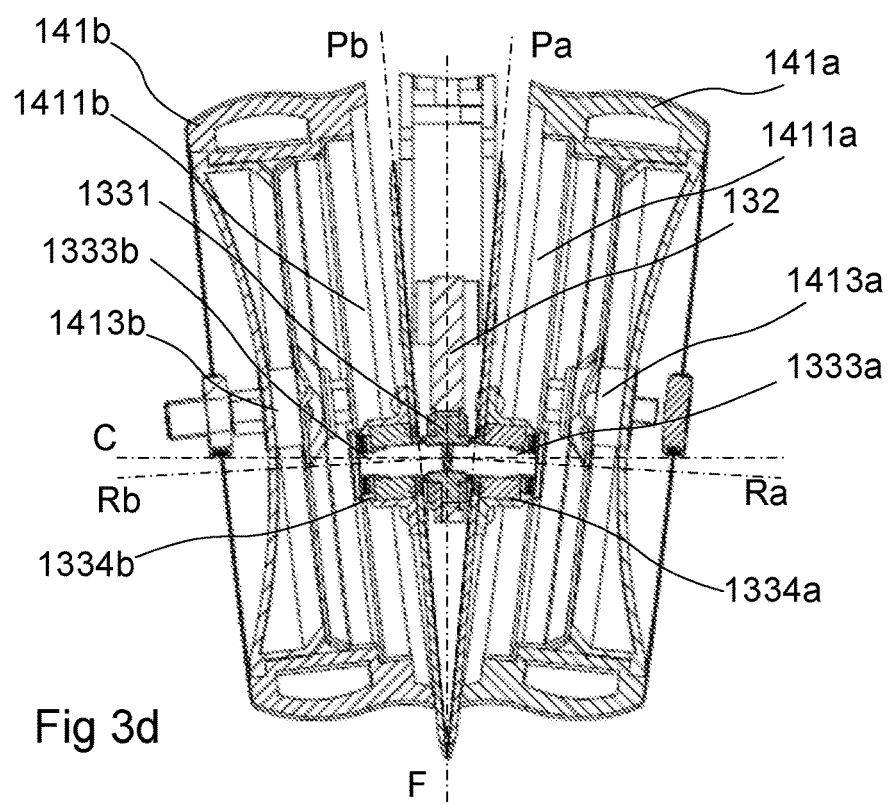
Figure 4C:
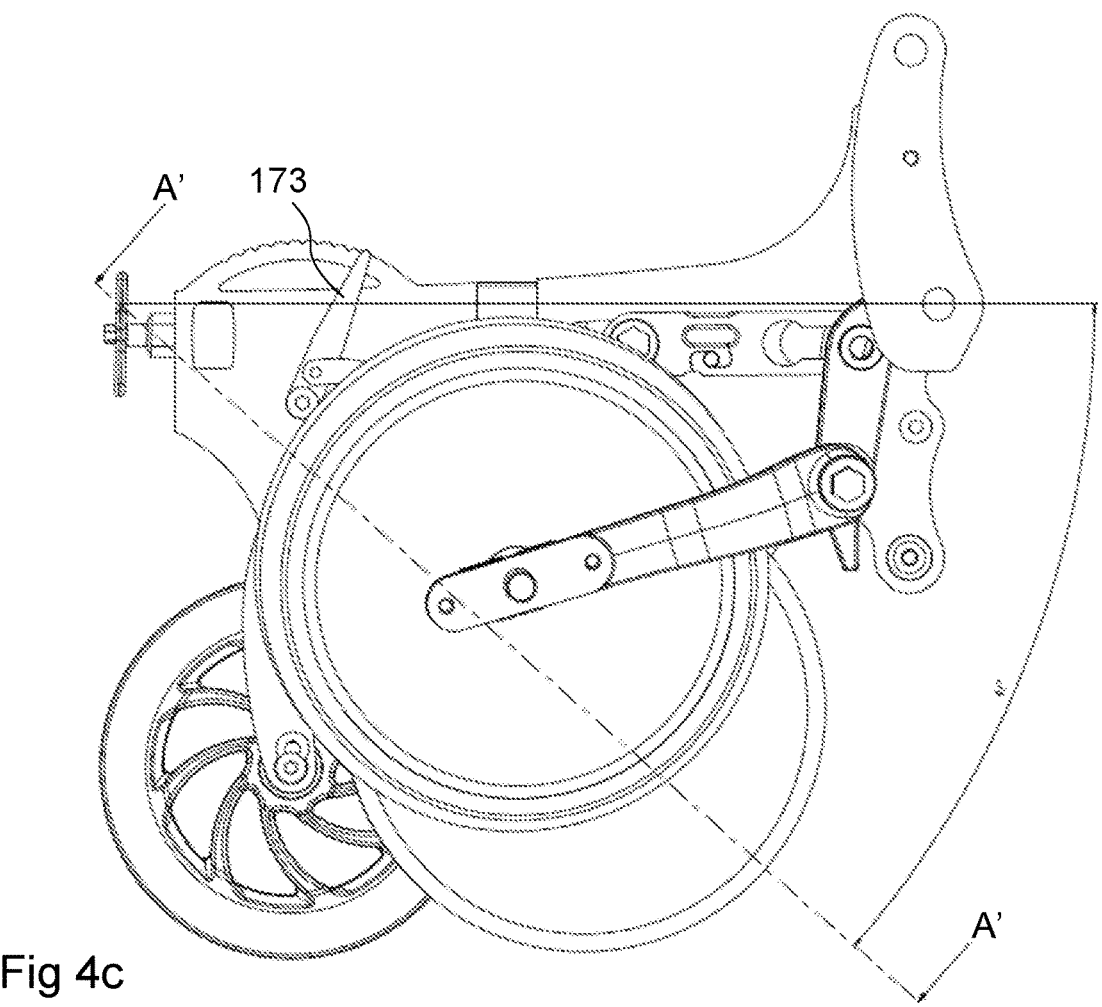
Figure 4D:
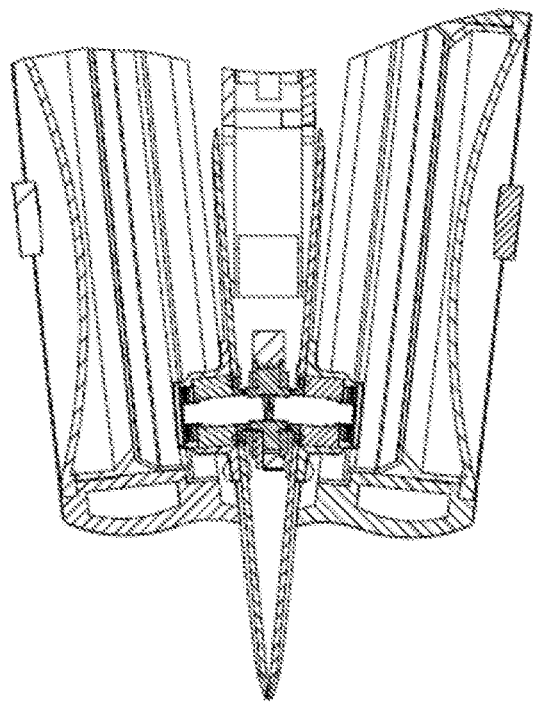

As will be seen in FIG. 3d, at least one of the mounting portions thus has a centre line Ra, Rb, which is non-parallel to the centre line C of the base unit 1331. In the example shown, both mounting portions have such centre lines that are non-parallel to the centre line of the base unit.

The centre lines Ra, Rb of the mounting portions are not parallel to each other either.

The mounting portions can be mirror-inverted relative to each other, viewed in a plane which is parallel to the seed furrow-opener arm 132.

The centre lines Ra, Rb of the mounting portions can form respective angles of 0.5-15 degrees, preferably 1-10 degrees, or 3-7 degrees, to the centre line C of the base unit.

Preferably, the centre lines of the mounting portions are located in a common plane. Consequently, for each of the seed discs the axis A, A' is located in the plane and is perpendicular to the axis of rotation of the seed disc.

The axle mount 1331 can at its periphery be mounted relative to the recess of the seed furrow-opener arm, so that the complete base unit, and thus the axles 1333a, 1333b are pivotable relative to the seed furrow-opener arm 132.

Alternatively (not shown), the axle unit 133 can comprise a first part which is fixedly mounted relative to the seed furrow-opener arm (or the row unit frame 11) and a second part, which is mounted relative to the first part, so that the second part is pivotable relative to the first part and thus relative to the seed furrow-opener arm (or the row unit frame 11).

As discussed above, the axle unit 133 can be pivotable relative to the seed furrow-opener arm 132 or the row unit frame 11. The axle unit 133 can be lockable in different positions by means of a screw, for example, or by means of a locking pin which engages with one of a number of locking positions.

Alternatively, the axle unit 133 can be adjustable by means of a link 135 engaging with an eccentrically located portion of the axle unit 133. For this purpose, the axle unit 133 can be provided with a hub arm 134, which functions as a lever for the link 135.

By means of manipulating the link 135, the angular position of the axle unit 133 relative to the seed furrow-opener arm 132 or the row unit frame 11 can therefore be set.

The link 135 can be locked in one of a number of positions, or alternatively, coupled to another part of the row unit, for example as described herein, so that the angular position of the axle unit 133 is adjustable in relation to the position of the depth regulator 14a, 14b.

The depth regulators 14a, 14b comprise a pair of gauge wheels 141a, 141b, a pair of supporting depth-regulating arms 142a, 142b for the respective gauge wheels and a depth-regulating pivoting arm 143a, 143b connected to the respective depth-regulating arm. Each of the depth-regulating pivoting arms 143a, 143b are fixedly connected to one of the depth-regulating arms 142a, 142b.

A first of the depth regulators 14a is located immediately next to, and, viewed in the transverse direction of the row unit, directly outside, a first of the seed furrow-openers 13a and a second one of the depth regulators 14b is located immediately next to, and, viewed in the transverse direction of the row unit, directly outside, a second one of the seed furrow-openers 14b.

The gauge wheels 141a, 141b are rotatable about the respective geometric axes, which have angles of just under 90 degrees relative to the direction of travel F of the agricultural implement.

The axes of rotation of the gauge wheels can be parallel to the axis of rotation Ra, Rb associated with the respective seed disc.

Alternatively, the axes of rotation of the gauge wheels can have greater angles to the transverse direction C than the axes of rotation of the seed discs have.

The gauge wheels 141a, 141b comprise a respective gauge wheel hub 1413a, 1413b, via which the gauge wheel is rotatable relative to the respective depth-regulating arm 142a, 142b.

The gauge wheels 141a, 141b have a respective axially open space 1411a, 1411b, which is turned inward, to an outside of the respective seed disc 131a, 131b.

The gauge wheels can be arranged, at least along a part of their peripheries, to bear against the respective seed disc 131a, 131b. Consequently, the seed disc hubs 1334a, 1334b can project into the axially open spaces 1411a, 1411b of the depth regulators 141a, 141b.

The depth-regulating hubs 1413a, 1413b can also partly project into the axially open space of the respective depth regulator.

The depth-regulating arms 142a, 142b are pivotally connected to the row unit frame 11 via the respective first depth-regulating couplings 144a, 144b and to the adjusting device 17 via the respective second depth-regulating couplings 145a, 145b.

The depth-regulating arms 142a, 142b extend from a respective proximal portion thereof, which is located at the respective first depth-regulating coupling 144a, 144b, wherein the gauge wheels 141a, 141b are located at the distal portion of the respective depth-regulating arm 142a, 142b.

The depth-regulating pivoting arms 143a, 143b extend from a respective proximal portion thereof, which is located at the respective first depth-regulating coupling 144a, 144b, wherein said second depth-regulating coupling 145a, 145b is located at the respective distal portion of the depth-regulating pivoting arms 143a, 143b.

The depth-regulating arms 142a, 142b form respective angles with the depth-regulating pivoting arms 143a, 143b, which can be of 45-145 degrees, preferably 70-135 degrees or 90-135 degrees.

The gauge wheels 141a, 141b can rotate about geometric axes of rotation, which are non-perpendicular to the direction of travel of the agricultural implement. For example, the axes of rotation of the gauge wheels can be parallel to the axes of rotation Pa, Pb of the seed furrow-openers.

The pressure device 16 comprises a press wheel 161 and a pressure device arm 162, which is pivotally connected to the row unit frame 11 at a pressure device coupling 163.

A lower portion of the pressure device arm 162 extends downward from the pressure device coupling 163. The press wheel 161 is rotatably connected to the pressure device arm 162 at its lower distal portion.

An upper portion of the pressure device arm 162 extends upward from the pressure device coupling 163. A pressure device control coupling 164 is arranged at the upper distal portion of the pressure device arm.

The sowing tube 15 can be arranged on a sowing tube arm 151, which can be fixedly connected to the pressure device arm 162, so that the mutual position of the sowing tube 15 and the press wheel 161 is fixed.

The adjusting device 17 can comprise a rotary member 171, a gear 172, converting rotation applied to the rotary member 171 to a linear movement, and an indicator 173. The gear 172 has a rotational portion 1721 and a linear portion 1722, which interact via a thread arrangement, so that rotation of the rotary member 171 brings a first part of the thread arrangement (for example, a male thread) to rotate, so that a second part of the thread arrangement (for example, a female thread) carries out a linear movement.

The rotary member 171 can be formed to be operated manually, as shown in the drawings.

Alternatively, the rotary member can be coupled to an actuator, such as an electrically, pneumatically or hydraulically driven actuator.

The indicator 173 can comprise an indicator arm 1731 which is mechanically connected to any part of the adjusting device 17 or to any part of the row unit 10 which can be acted on by the adjusting device and a scale 1732, which is fixed relative to the row unit frame 11.

In the example shown, the indicator comprises an indicator link 1733, which is connected to one of the pressure device arm, the depth-regulating arms and the seed furrow-opener arm 132, so that the position of said arm is mechanically transferred to the indicator arm 1731 so that this shows the angular position of the arm relative to the scale 1732.

Alternatively, the indicator 173 can comprise a sensor, which is arranged to provide a signal corresponding to a position of a part which can be acted on by the adjusting device 17 relative to the row unit frame 11.

The adjusting device 17 can be connected to the seed furrow-openers 13a, 13b, so that the orientation of the seed furrow-openers relative to the row unit frame 11 is adjustable by means of the adjusting device 17.

More precisely, the adjusting device 17 can be connected to the seed furrow-opener arm 132, so that the pivotal position of the seed furrow-opener arm relative to the row unit frame 11 is adjustable by means of the adjusting device 17.

As a non-limiting example, this can be provided by means of the linear portion 1722 of the gear 172 being connected to the upper distal portion of the seed furrow-opener arm 132, so that the pivotal position of the seed furrow-opener arm about the first coupling 136 is controllable by means of the adjusting device 17.

The adjusting device 17 can be connected to the depth regulators 14a, 14b, so that the orientation of the depth regulators relative to the row unit frame 11 is adjustable by means of the adjusting device 17.

More precisely, the adjusting device 17 can be connected to the depth-regulating arms 142a, 142b, so that the pivotal position of the depth-regulating arms relative to the row unit frame 11 is adjustable by means of the adjusting device 17.

As a non-limiting example, this can be provided by means of the distal portions of the depth-regulating pivoting arms 143a, 143b, possibly via couplings 145a, 145b, being connected to the linear portion 1722 directly, or via a depth-regulating link 18, so that the pivotal position of the depth-regulating pivoting arms, and thus also the depth-regulating arms 142a, 142b, about the depth-regulating couplings 144a, 144b is controllable by means of the adjusting device 17.

The depth-regulating link 18 can be longitudinal and have couplings located at the respective ends for connection to the linear portion 1722 of the adjusting device 17 or the distal portions of the depth-regulating pivoting arms 143a, 143b.

The adjusting device 17 can be connected to the pressure device 16, so that the orientation of the pressure device relative to the row unit frame is adjustable by means of the adjusting device 17.

More precisely, the pressure device 16 can be connected to one of the seed furrow-opener arm 132 or the depth-regulating arms 142a, 142b, so that the pivotal position of the pressure device relative to the row unit frame 11 is adjustable by means of the adjusting device 17.

As a non-limiting example, this can be provided by means of the upper distal portion of the pressure device arm 162 being connected to the upper distal portion of the seed furrow-opener arm 132 via a pressure device link 19, so that the pivotal position of the pressure device arm about the coupling 163 is controllable by means of the adjusting device 17, which is connected to the upper distal portion of the seed furrow-opener arm.

The pressure device link 19 can be pivotally connected to the upper distal portion of the pressure device arm 162 via a coupling 164. Furthermore, the pressure device link 19 can be pivotally connected to the upper portion of the seed furrow-opener arm 132 via a coupling 138.

By means of the pressure device link 19 connecting the upper distal portion of the seed furrow-opener arm 132 to the upper distal portion of the pressure device arm 162, the pressure device 16 follows the seed furrow-opener 13a, 13b, so that the pressure device is displaced rearward when the seed furrow-opener is displaced rearward and so that the pressure device is displaced forward when the seed furrow-opener is displaced forward.

Alternatively, the upper portions of one of the pressure device arm 162 and the seed furrow-opener arm 132 can be connected to the lower portions of the other one of the pressure device arm 162 and the seed furrow-opener arm 132. As a result, the pressure device 16 and the seed furrow-opener 13a, 13b can be brought to move toward each other or away from each other when the position of one of them changes.

Figure 7:
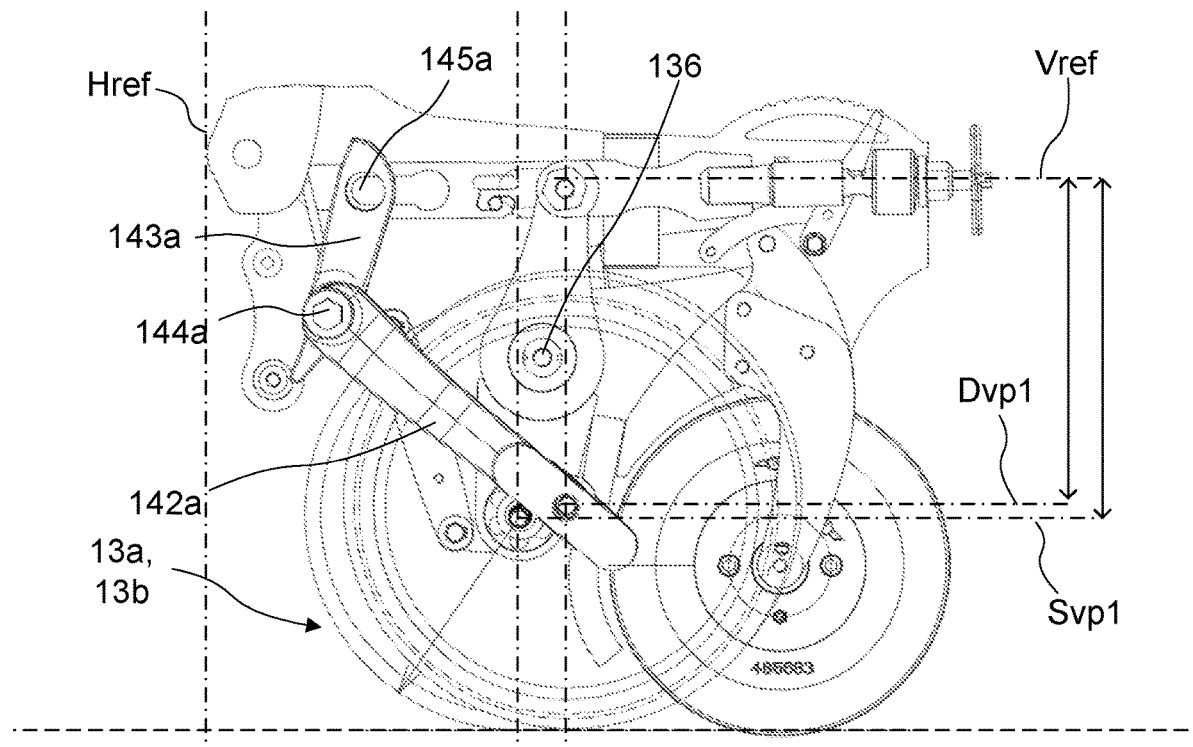
FIG. 7 shows the row unit in FIGS. 3a-3b and 5a-5b viewed from the left side in the direction of travel.
Figure 8:
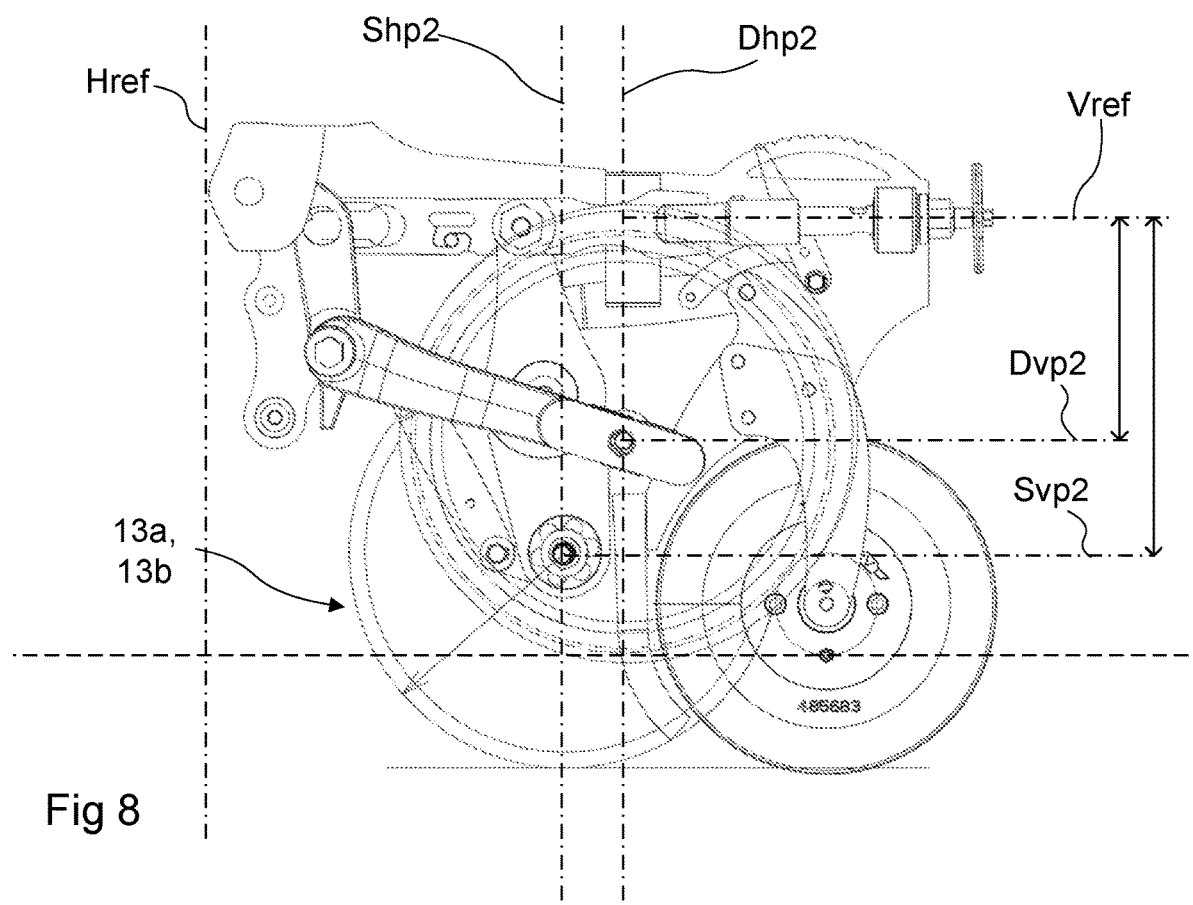
FIG. 8 shows the row unit in FIGS. 4a-4b and 6a-6b viewed from the left side in the direction of travel.

By means of selecting the distance between the respective coupling 136, 163 and the respective link attachment 138, 164, the magnitude of the movements can be determined. FIGS. 7 and 8 show the row unit viewed from the left side in the direction of travel F.

Vertical lines show the positions of the depth regulator and the seed furrow-opener in the horizontal direction at a minimum drilling depth (Dhp1, Shp1) and at a maximum drilling depth (Dhp2, Shp2), respectively. A vertical reference line Vref and a horizontal reference line Href are marked in the figures.

Horizontal lines show the positions of the depth regulator and the seed furrow-opener in the vertical direction at a minimum drilling depth (Dvp1, Svp1) and at a maximum drilling depth (Dvp2, Svp2), respectively.

The depth-regulating arm is rotatable about the axle 144a, 144b.

The seed furrow-opener arm is rotatable about the axle 136.

From FIG. 7 to FIG. 8, the depth-regulating arm has rotated about the axle 144a, 144b so that the vertical position of the depth regulator is changed more than the vertical position of the seed furrow-opener has changed.

At the same time, the horizontal position of the depth regulator is changed more than the horizontal position of the seed furrow-opener has changed.

The axis of rotation 144a, 144b of the depth-regulating arm is located on a higher vertical level than the axis of rotation 136 of the seed furrow-opener arm.

The axis of rotation 144*a*, 144*b* of the depth-regulating arm 1421, 142*b* is also in front of the axis of rotation 136 of the seed furrow-opener arm, viewed in the direction of travel F.

A distance from the axis of rotation 144*a*, 144*b* of the depth-regulating arm to the axis of rotation of the depth regulator is greater than a distance from the axis of rotation 136 of the seed furrow-opener arm 132 to the axis of rotation of the seed furrow-opener 131*a*, 131*b*.

By means of the seed furrow-opener being displaced horizontally rearward when the depth regulator is set for a greater drilling depth, the depth regulator can be moved a little further upward before its inner surface bears against the seed disc hub.

By means of the seed furrow-opener being displaced horizontally forward when the depth regulator is set for a smaller drilling depth, the depth regulator can be moved further upward before the depth-regulating hub bears against the seed disc hub.

With reference to FIG. 3*a*, an aperture which is open in a lateral direction behind the lowest point of the seed furrow-opener and in front of the lowest point of the press wheel is formed during shallow sowing. During deep sowing, this aperture is located down in the seed furrow, however during shallow sowing it may be located fully or partly above the ground surface.

This aperture can be a problem as seeds bouncing obliquely can fly out in a lateral direction through the aperture.

One way of reducing the problem with the aperture which is open in a lateral direction is, when the seed furrow-opener is displaced forward, to also displace the press wheel forward. As a result, the size of the aperture can be reduced, or alternatively, the aperture can be completely eliminated.

FIGS. 9*a*-9*d* show a press wheel 161, which can be used in the row unit shown herein, or in another row unit. The press wheel 161 comprises a hub portion 1611, which can be formed to be arranged on an axle unit (not shown) which can comprise a bearing, such as a friction bearing or a roller bearing, so that the wheel is rotatable about a wheel axle.

The press wheel further comprises a pressure surface 1612, which is located furthest out on the periphery of the wheel and faces radially outward.

Between the hub portion 1611 and the pressure surface 1612, a plurality of spokes 1613 extends. The spokes are of so-called inclined type, also known as "slanted spoke", which means that each spoke extends from the hub portion 1611 with a direction De which is non-parallel to a radius Rh when the spoke is attached to the hub portion 1611.

The spokes can be straight (not shown) between the hub and the pressure surface 1612.

Alternatively, the spokes can be curved, so that an angle between the direction De of the spoke and the radius Rh, viewed along the spoke, increases with an increased distance to the hub portion 1611.

According to another alternative (not shown), an angle between the direction De of the spoke and the radius Rh, viewed along the spoke, can decrease with an increased distance to the hub portion 1611.

A material portion 1614 can be present at the radially outer portion of the wheel.

This material portion 1614 can have radially outward tapering cross sections.

The material portion 1614 can be formed with a radial extension from the radially outermost portion of the spokes to the pressure surface 1612, which is greater than a maximum axial extension of the press wheel. For example, said radial extension can be 130-300% of said axial extension, preferably 150-250%.

The material portion 1614 can be hollow and have a wall thickness amounting to 25-50% of the maximum axial extension of the material portion 1614, preferably 30-50%.

The material portion 1614 can be substantially solid.

The material portion can have a radial extension which is greater than its axial extension.

The pressure surface 1612 can be substantially plane. Alternatively, the pressure surface can be concave outwardly or convex outwardly.

Specifically a central portion of the pressure surface 1612, viewed in an axial direction, has a width of 5-15 mm, preferably 5-12 mm. This central portion can be convex as shown in the drawings. Alternatively, the central portion can be plane. As an additional alternative, the central portion can be concave. When the central portion is concave, the depth of the concavity must not exceed 2 mm, preferably not exceed 1 mm.

During operation, a resulting force component of the wheel is not vertical, but directed obliquely downward/upward viewed in the direction of travel.

The wheel gives rise to different ground pressure or resilience depending on which direction of rotation it has.

Figures 9A, 9B, 9C:
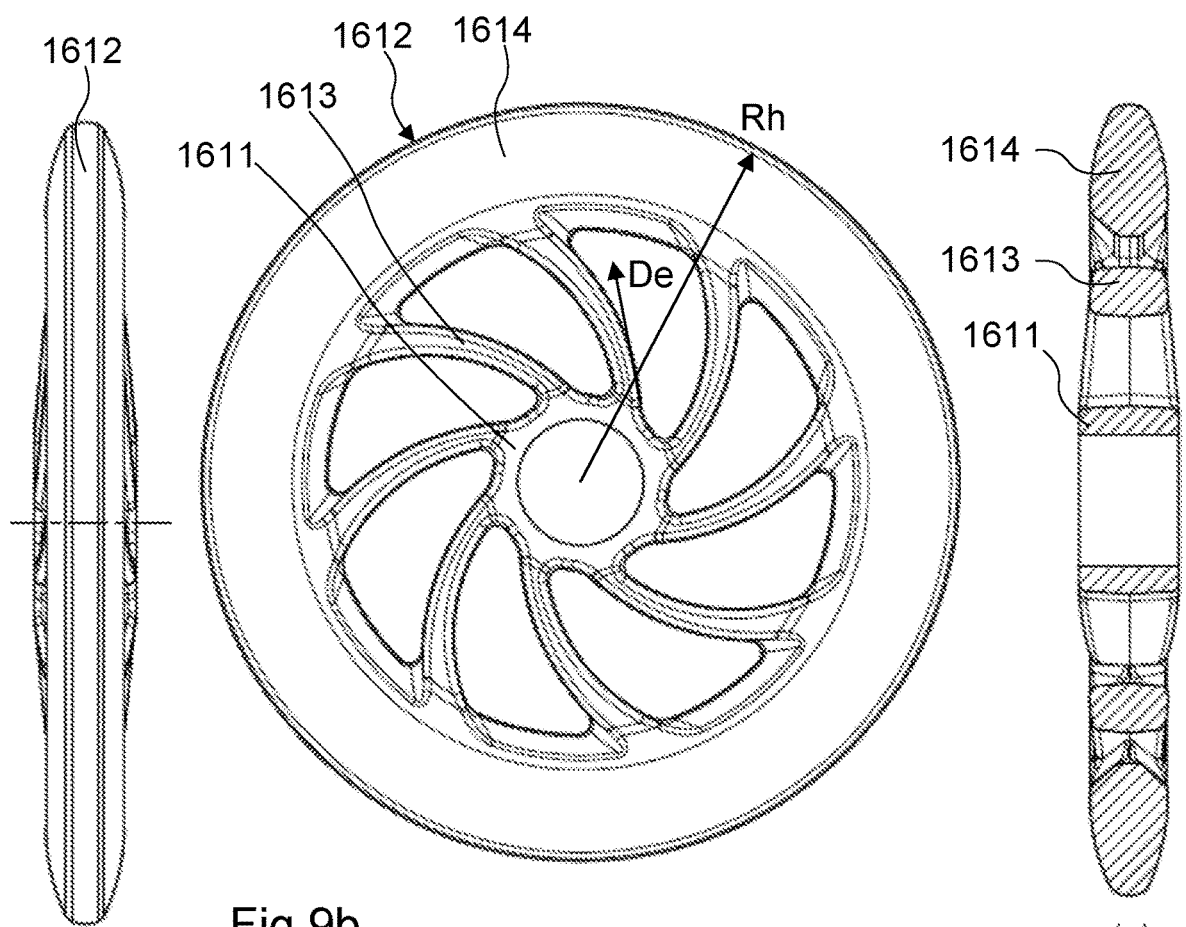
FIGS. 9a-9d show a press wheel.
Figure 9D:
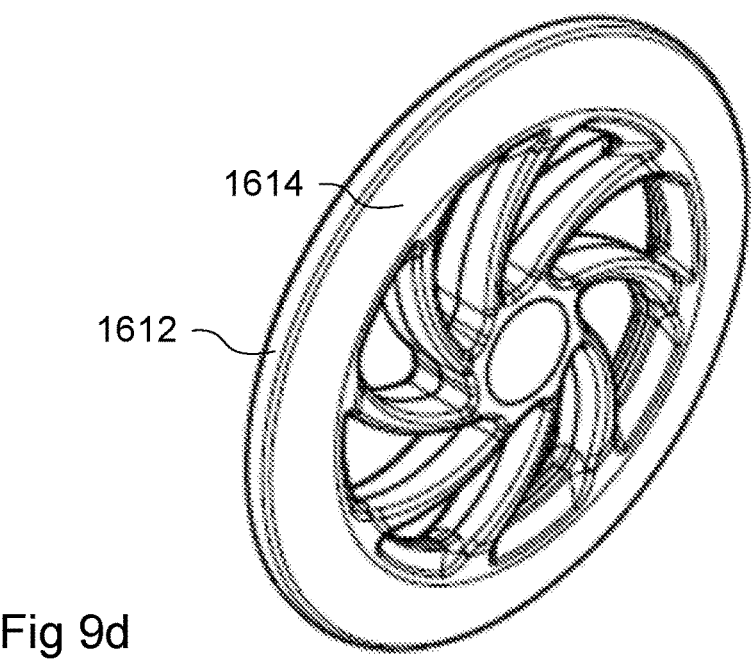
Figure 10A:
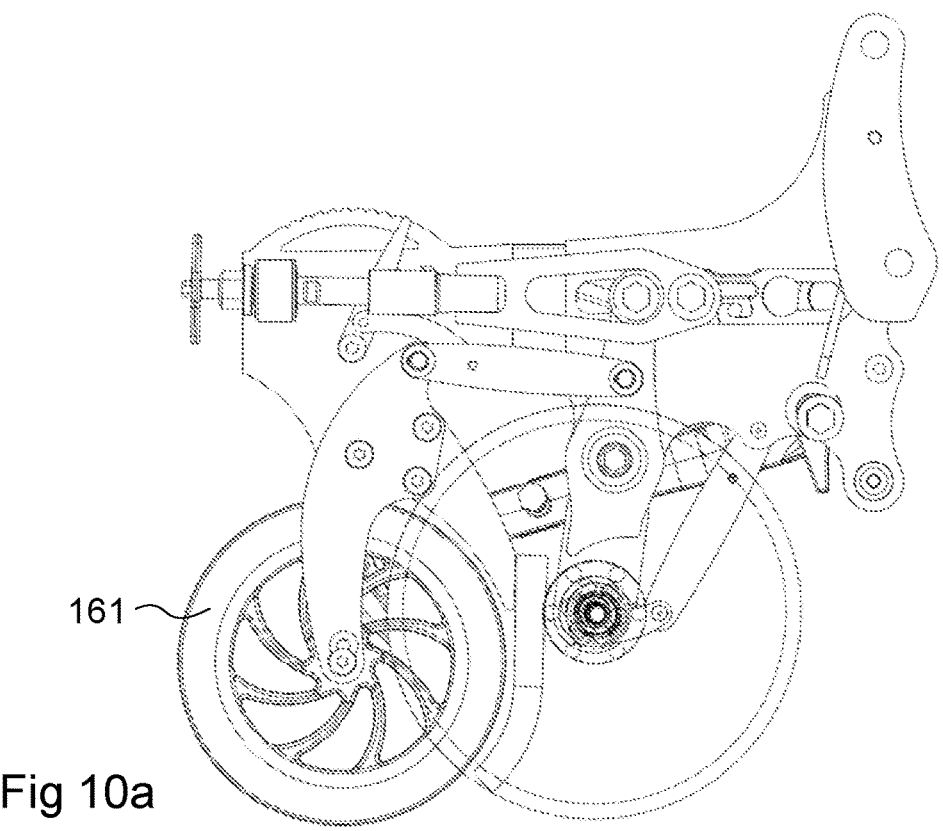
FIGS. 10a-10b show a row unit with the press wheel placed in two alternative rotation directions.
Figure 10B:
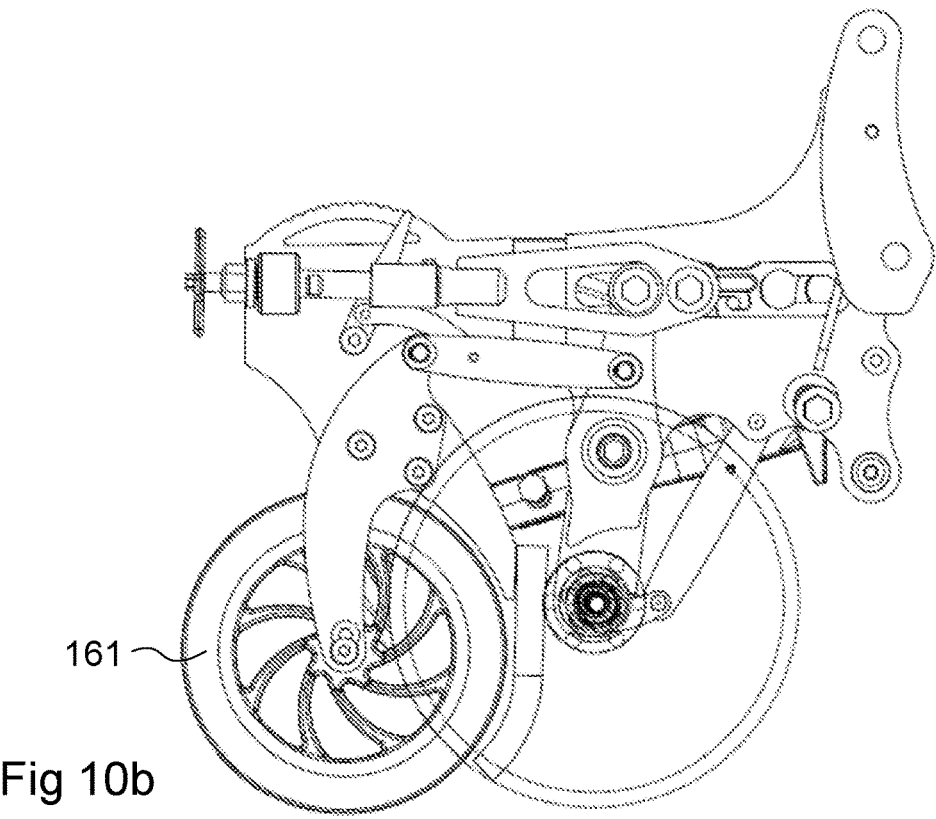

Consequently, if the wheel is mounted for a direction of travel to the right in FIG. 9*b*, i.e. as shown in FIG. 10*b*, its hardness is greater than if it is mounted for a direction of travel to the left in FIG. 9*b*, i.e. as shown in FIG. 10*a*.

Accordingly, it is possible to determine the hardness of the wheel by selecting its direction of rotation.

It is possible to replace the depth-regulating link 18 with a force sensor 30, according to what will be described below, with reference to FIGS. 11*a*-11*c*, FIGS. 12*a*-12*c* and FIGS. 13*a*-13*c*.

The force sensor comprises a sensor body 301 and at least one sensor 310*a*, 310*b*, which is positioned to detect a change in length of an outer portion of the sensor body.

The sensor body 301 can be made of any chosen material with sufficient strength and yield strength. Metal is typically used. The metal is chosen so that a sufficient yield strength is provided.

The sensor body 301 can be formed as a substantially plane and elongate part, extending between a pair of ends and comprising a pair of main surfaces, a pair of short-side surfaces 303*a*, 303*b* and a pair of long-side surfaces 302*a*, 302*b*.

Attachment points 304*a*, 304*b* are provided at the ends and can be formed by recesses, holes, protrusions, posts, or similar. In the described example, the recesses in the form of through-holes with a circular hole area are shown. The dimension of the hole is selected in order to reduce the risk of ruptures, etc.

The attachment points 304*a*, 304*b* can be arranged so that a centre line Lc through their geometric centres of gravity extends parallel to the longitudinal direction of the sensor body.

On one side of a plane which contains the centre line Lc and which is perpendicular to the main surfaces, a material bridge 305 is formed. The material bridge 305 is located at a distance from the central plane by means of a recess 307 being formed.

The recess 307 can be elongate so that the material bridge 305 has a pair of material bridge main surfaces, which can be parallel to the main surfaces, and a pair of side material bridge surfaces, which can be parallel to the long-side surfaces.

Since the material bridge 305 is displaced from the plane that contains the centre line Lc, the material bridge bends in a plane parallel to the main surfaces when a traction force or a pressure force is provided on the attachment points 304a, 304b, in parallel to the centre line Lc. The height, width and cross-sectional shape of the material bridge are formed in order to provide the desired bending strength.

One or more sensors 310a, 310b, which can be a strain gauge, are arranged on the material bridge 305. The sensor 310a, 310b is preferably arranged on the side of the material bridge 305 whose strain/compression is to be measured. Some sensors of this type can be used in order to measure extension (i.e. traction force) as well as a compression (i.e. pressure force). A combination of several sensors 310a, 310b can be used.

One possibility is to arrange the sensors 310a, 310b on opposite sides of the material bridge 305, so that when the material bridge, shown in the figures, bends as a result of a traction force on the sensor, one of the sensors 310a indicates a strain and the second sensor 310b indicates a compression.

In the example shown, a strain gauge is utilized, and since the force sensor is designed to measure a traction force between the attachment points 304a, 304b, the strain gauge is arranged on the side surface of the material bridge 305 facing the centre plane.

When using other types of sensors, the location of the material bridge can be varied for optimal function.

On the other side of the plane which contains the centre line Lc, a force limiter 306 is provided, comprising a pair of contact surface 3063a, 3063b, which, when a load on the force sensor is lower than a maximum load, are located at a distance from each other and which, when the load reaches the maximum load, come into contact with each other, so that force between the attachment points 304a, 304b is also transferred via the force limiter 306.

In the example shown, the force sensor 30 is thereby designed to measure a traction force between the attachment points, and accordingly the force limiter comprises a pair of surfaces that are brought into engagement with each other when material portions located on the respective sides of the force limiter are pulled apart.

The force limiter 306 comprises here a first force-limiting portion 3062a associated with the first attachment point 304a and a second force-limiting portion 3062b associated with the second attachment point 304b. The portions 3062a, 3062b overlap each other both in the longitudinal direction and in a width direction, so that a contact surface 3063a associated with the first attachment point faces the first attachment point 304a and a contact surface 3063b associated with the second attachment point 304b faces the second attachment point 304b.

Figure 11A:
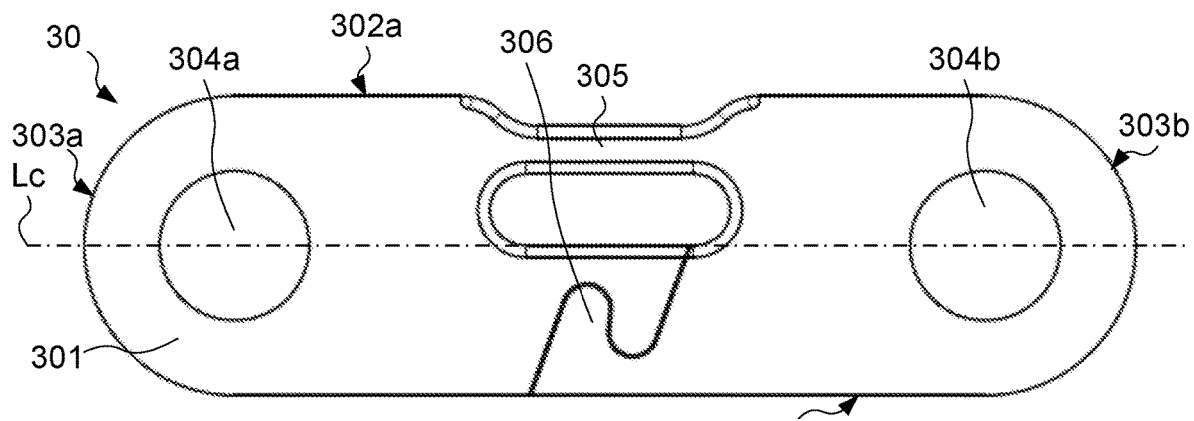
FIGS. 11a-11c show a force sensor according to a first embodiment.
Figure 11B:
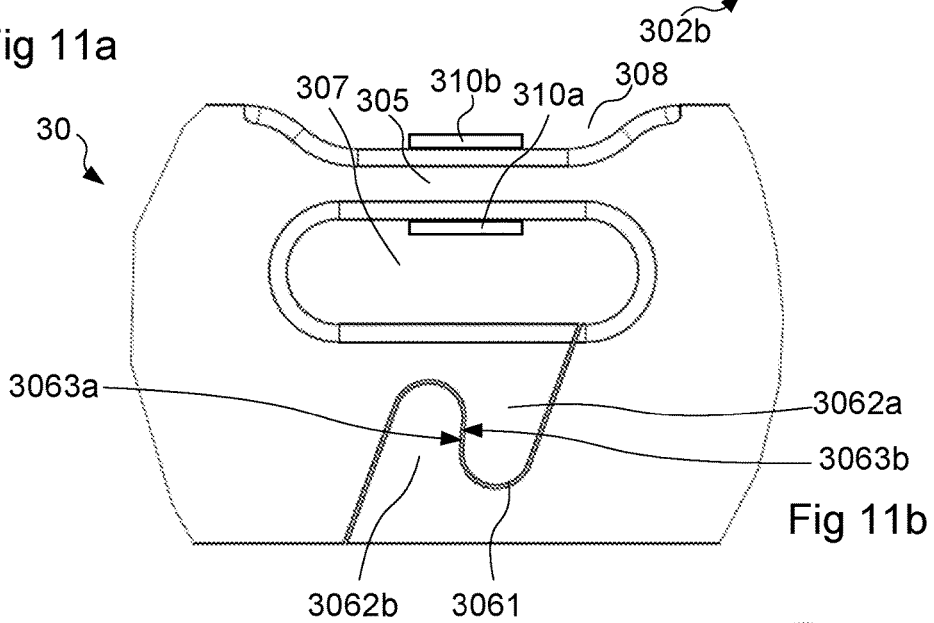
Figure 11C:
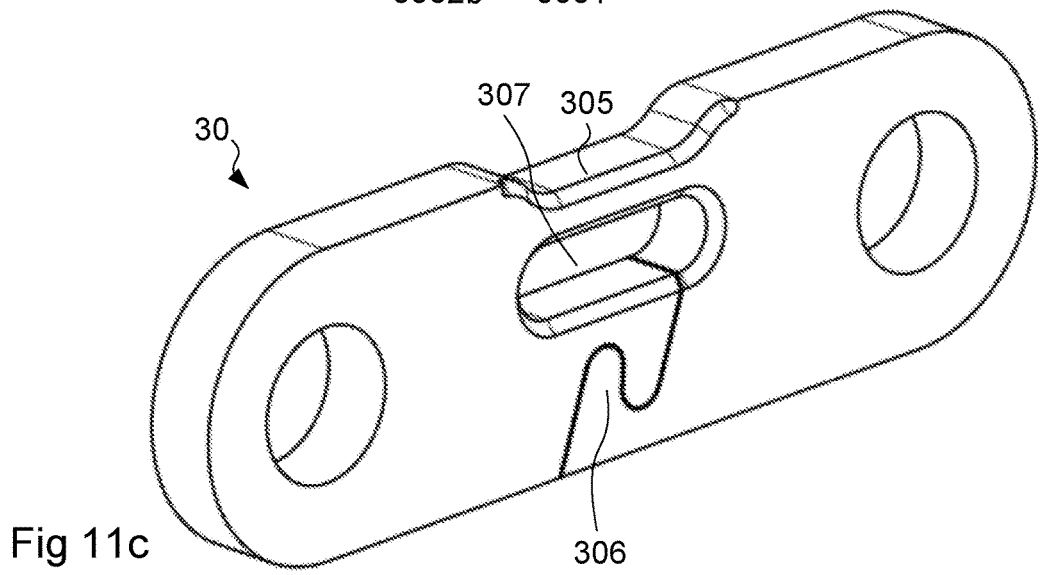

In the example shown in FIGS. 11a-11c the portions are formed by means of an S-shaped groove 3061 being cut from the central recess 307 to one of the long-side surfaces 302b.

By means of the S-shaped groove 3061, the two portions 3062a, 3062b are formed, being directly connected to the respective attachment 304a, 304b and carrying a locking surface 3063a, 3063b each, facing the attachment associated with the respective locking surface. "Directly connected" means that the connection is not made via the material bridge.

By means of the locking surfaces facing the respective associated attachment, the locking surfaces engage with each other when a traction force applied on the attachments is sufficiently great to eliminate the gap created by the groove 3061.

A recess 308 can be formed at the material bridge 305 in the long-side surface 302a located nearest to the material bridge 305. The length and depth of the recess can be adjusted in order to provide a material bridge 305 with the desired bending strength, and/or in order to house a sensor element.

Figure 12A:
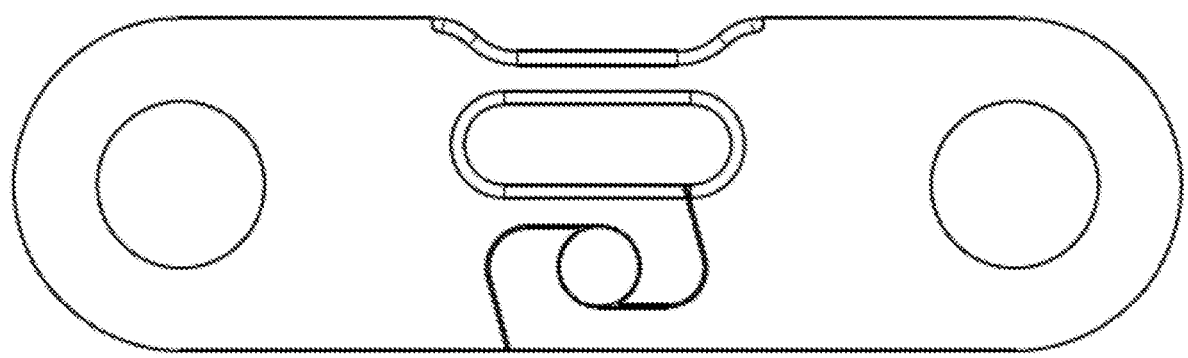
FIGS. 12a-12c show a force sensor according to a second embodiment.
Figure 12B:
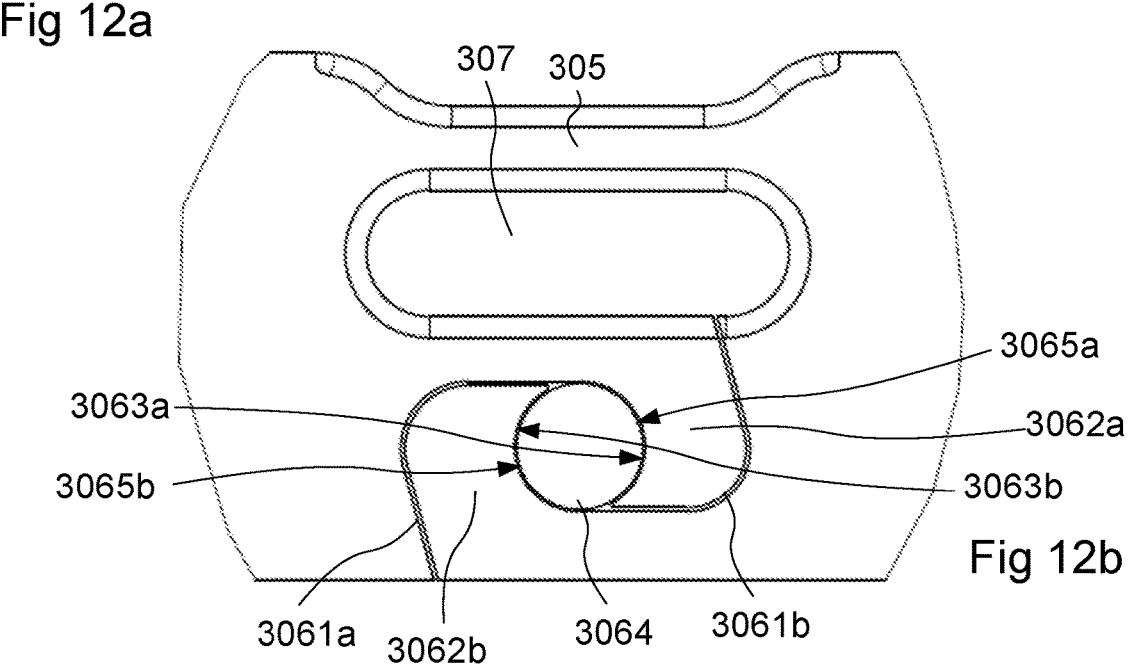
Figure 12C:
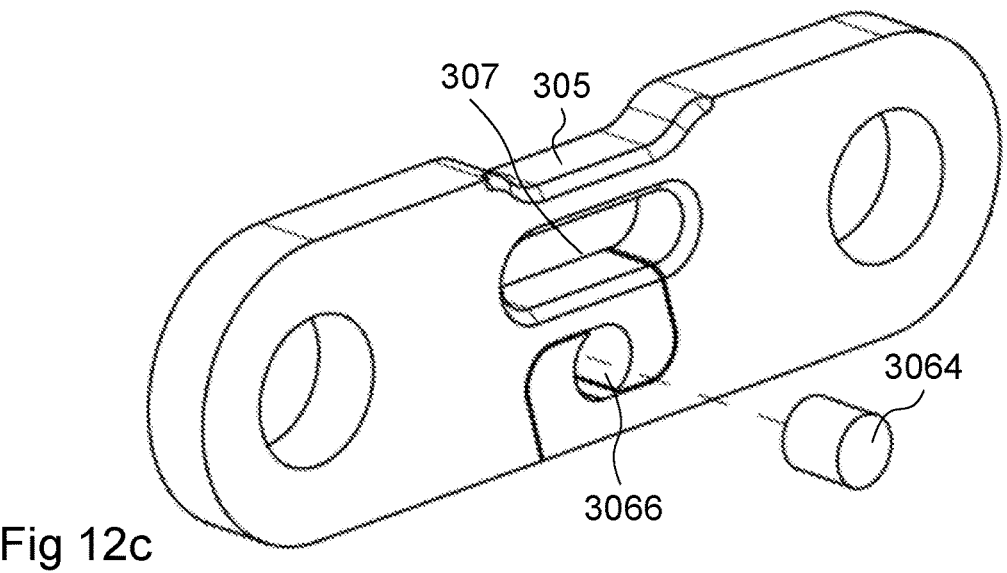

The example shown in FIGS. 12a-12c largely corresponds to the example shown in FIGS. 11a-11c, but with the difference that the force-limiting portions 3062a, 3062b, in addition to being formed by means of an S-shaped groove 3061a, 3061b, also comprise a hole 3066, in which a separate part 3064 is arranged. The hole 3066 is formed so that its edges are tangent with the S-shaped groove.

By means of forming the groove 3061a, 3061b so that it forms a gap in the longitudinal direction between the contact surfaces 3063a, 3063b of the groove and the corresponding contact surfaces 3065a, 3065b on the part 3064, the corresponding force-limiting function in the embodiment according to FIGS. 11a-11c can be provided. The part 3064 can be brought into retention by means of adhesion, by means of a separate retainer part (not shown) or by means of the sides of the sensor 30 being covered at least partly, so that the part 3064 is prevented from leaving the hole 3066.

Alternatively, the dimension of the hole across the plane containing the centre line Lc can be such that the part 3064 is press-fitted in this transverse direction, and thus prevented from leaving the hole 3066.

The embodiment in FIGS. 13a-13c corresponds to the embodiment described with reference to FIGS. 12a-12c, except for a few differences.

Here the second attachment 304b is formed with a shape that corresponds to a keyhole, comprising a narrower portion 304b2 and a wider portion 304b1, where the wider portion is located closer to the material bridge and the narrower portion 304b2 is located closer to the second short-side surface 303b of the sensor.

The attachment 304b can be utilized to facilitate mounting and to permit that the depth-regulating levers, which can be attached to the attachment 304a by means of a yoke extending through the attachment 304a, which can permit horizontal relative movement between the depth-regulating levers.

Figure 13A:
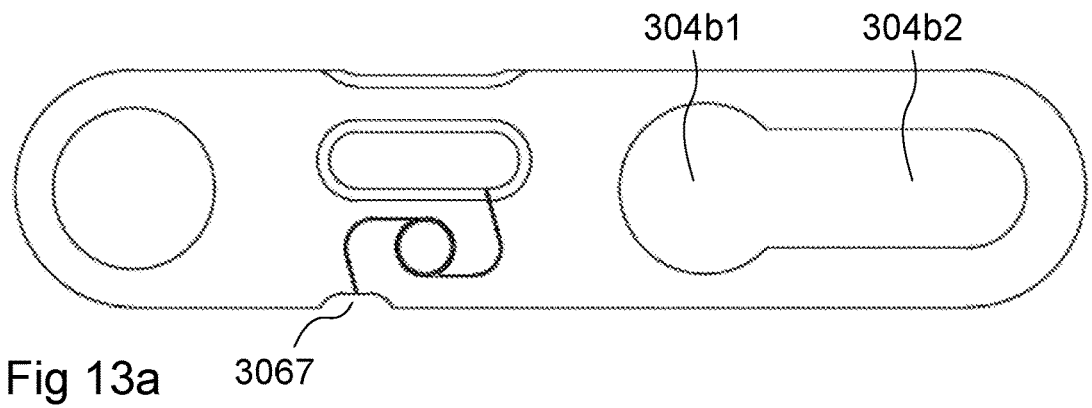
FIGS. 13a-13c show a force sensor according to a third embodiment.
Figure 13B:
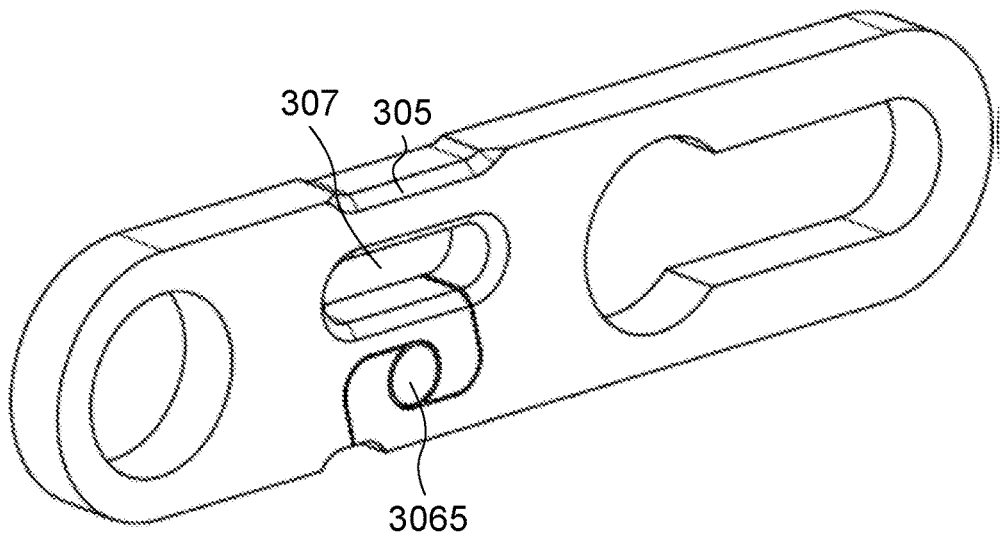
Figure 13C:
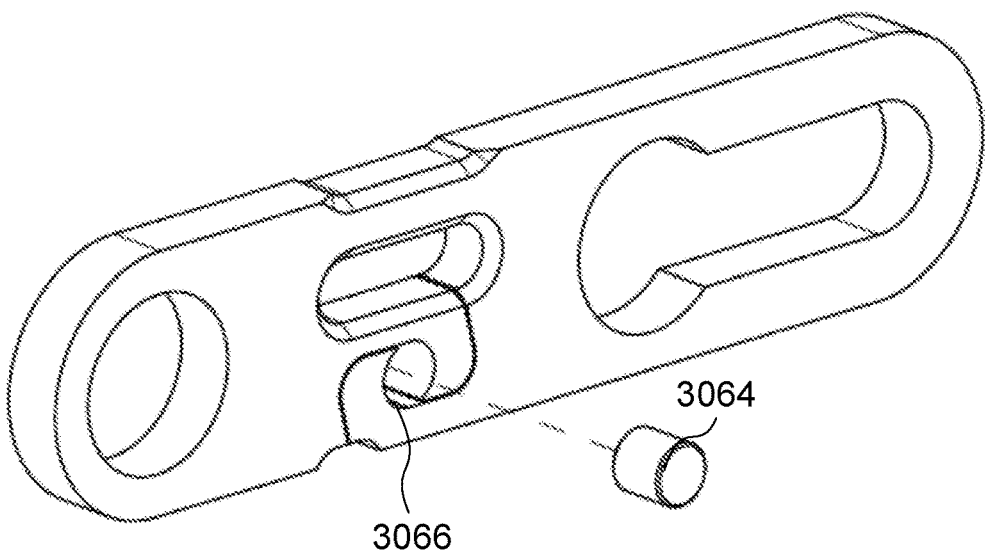

Furthermore, the groove in FIGS. 13a-13c is formed with a recess 3067 in the second long-side surface 302b, so that the groove opens into said recess.

The sensor body can thus be made from a plane blank, which is cut using a suitable method, for example laser-cutting. When cutting the S-shaped groove, the groove can be cut starting from the recess 307 and almost the full length of the long-side surface 302b. After that, the hole 3066 can be formed. Finally, the recess 3067 is formed so that the parts 3062a, 3062b are separated from each other. By means of both the groove and the hole being formed before separating the parts 3062a, 3062b from one another, the rigidity of the sensor body can be maintained during processing, which is advantageous in order to maintain a high precision during manufacturing and especially during drilling of the hole 3066.

It will be appreciated that both the distance of the material bridge 305 to the plane containing the centre line Lc as well as the distance of the contact surfaces 3063a, 3063b; 3065a, 3065b to the plane containing the centre line Lc affect the characteristics of the force sensor.

The middle portion of the force sensor, i.e. the portion between the attachments, can be enclosed in a casing (not shown). The casing can be provided by means of arranging a piece of shrinkable tubing about the finished force sensor and heating it. The casing can fully or partly contribute to retaining the part 3064 in position.

The force sensor can be used to measure a relatively small force with good precision using a single sensor 310a, 310b. In the case of an agricultural implement, this force can be a force corresponding to the force between the gauge wheel and the ground.

If the force is excessive the ground pressure can be adjusted. This can be provided by means of adjusting the ground pressure for each row unit individually, or by means of adjusting the ground pressure for the whole agricultural implement.

If each row unit has an individually adjustable height adjustment relative to the frame of the agricultural implement, the force can be read for each separate row unit, so that the ground pressure for each separate row unit can be controlled individually.

Alternatively, the ground pressure for the whole agricultural implement can be controllable. Such control can be combined with individual control, for example for carrying out adjusting when all row units show a ground pressure which is too high or too low.

Another alternative is to permit common control in sections, so that all row units associated with a certain section of the agricultural implement have a common height adjustment. This can also be supplemented with each row unit having individual height adjustment/ground pressure adjustment.

When using the force sensor, the force is measured right up to the point when the material bridge has bent outward so much so that the force limiter 306 is engaged. When the force limiter is engaged, the characteristic of the force sensor, which is normally linear, changes. This can be read and used as an indication that the maximum force has been reached.

Alternatively, a second sensor 310b can be arranged on the opposite side of the material bridge 305, as shown in FIG. 11b.

Up to the point when the force limiter 306 is engaged, the second sensor 310b shows a compression, i.e. indicates a force using opposite signs compared to what is indicated by the first sensor 310a.

When the force limiter is engaged, the force indicated by the second sensor 310b can change sign, which can be read and used as an indication that the maximum force has been reached. Alternatively, or as a supplement, the derivative of the indicated force can change sign, which can be used as an indication that the maximum measurable force has been exceeded.

The invention claimed is:

1. Row unit for an agricultural implement, comprising:
   a frame and a seed furrow-opener,
   wherein the seed furrow-opener comprises a pair of seed discs rotatably connected to the frame via at least one axle unit,
   wherein each of the seed discs has a respective geometric axis of rotation,
   wherein the axes of rotation are non-parallel to each other, so that a mutual spacing between the peripheries of the seed discs is non-constant,
   wherein the at least one axle unit is pivotable relative to the frame, so that the orientation of at least one of the axes of rotation is adjustable, and
   wherein the row unit further comprises a hub link, which is pivotally connected to the at least one axle unit, rotatably connected relative to the frame, at a distance from a center of rotation for the rotation of the at least one axle unit relative to the frame.

2. Row unit according to claim 1, further comprising an adjusting device, which is designed to act on the pivotal position of the at least one axle unit relative to the frame.

3. Row unit according to claim 1, further comprising a hub lever, which is fixedly connected to the at least one axle unit rotatably connected relative to the frame and which extends outside a radial outer portion of the at least one axle unit, wherein the hub link is pivotally connected to the hub lever.

4. Row unit according to claim 1, further comprising at least one depth regulator, wherein the at least one axle unit is mechanically connected to the depth regulator, so that the pivotal position of the axle unit is adjustable in a predetermined relationship to a set depth of the row unit.

5. Row unit according to claim 1, wherein the at least one axle unit comprises an axle mount, having a pivot axis, about which the axle mount is pivotable relative to the frame and a seed disc axle, about which the seed disc is rotatable, wherein the pivot axis and the seed disc axle are non-parallel to each other.

6. Row unit according to claim 5, wherein the axle mount has a pair of seed disc axles, which are non-parallel to each other and to the pivot axis.

7. Row unit according to claim 1, wherein the row unit comprises a row unit frame and a seed furrow-opener arm, which is pivotable relative to the row unit frame, wherein the at least one axle unit is pivotable relative to the seed furrow-opener arm.

8. Agricultural implement comprising at least one row unit according to claim 1.

9. Method of adjusting a row unit, wherein the row unit comprises:
   a frame and a seed furrow-opener,
   wherein the seed furrow-opener comprises a pair of seed discs rotatably connected to the frame via at least one axle unit,
   wherein each of the seed discs have a respective geometric axis of rotation, and
   wherein the axes of rotation are non-parallel to each other, so that a mutual spacing between the peripheries of the seed discs is non-constant, viewed along the circumference of one of the seed discs,
   the method comprises pivoting the at least one axle unit relative to the frame, so that the orientation of at least one of the axes of rotation is changed,
   wherein pivoting the at least one axle unit relative to the frame comprises manipulating a hub link, which is pivotally connected to the at least one axle unit, rotatably connected relative to the frame, at a distance from a center of rotation for the rotation of the at least one axle unit relative to the frame.

10. Method according to claim 9, further comprising pivoting the at least one axle unit together with at least one of a depth regulator and a pressure device.

11. Method according to claim 10, wherein the at least one axle unit is pivoted together with an arm that supports said depth regulator or a press wheel.

* * * * *